(12) United States Patent
Mori et al.

(10) Patent No.: US 8,718,875 B2
(45) Date of Patent: May 6, 2014

(54) VEHICLE MOTION CONTROL APPARATUS

(75) Inventors: Ryoji Mori, Wako (JP); Yuuji Sakaki, Wako (JP); Noriaki Suzuki, Wako (JP); Teppei Komori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 13/040,374

(22) Filed: Mar. 4, 2011

(65) Prior Publication Data

US 2011/0218706 A1    Sep. 8, 2011

(30) Foreign Application Priority Data

Mar. 5, 2010 (JP) ................................. 2010-049724

(51) Int. Cl.
*G06F 17/00* (2006.01)

(52) U.S. Cl.
USPC .................... 701/42; 701/78; 701/83; 701/90

(58) Field of Classification Search
USPC ........... 701/41, 42, 70, 71, 78, 79, 80, 83, 90, 701/91
See application file for complete search history.

(56) References Cited

U.S. PATENT DOCUMENTS

| 2009/0012669 | A1* | 1/2009 | Takenaka et al. | 701/29 |
| 2009/0024293 | A1* | 1/2009 | Takenaka et al. | 701/71 |
| 2009/0118905 | A1* | 5/2009 | Takenaka et al. | 701/41 |
| 2009/0132137 | A1* | 5/2009 | Takenaka et al. | 701/70 |
| 2009/0171526 | A1* | 7/2009 | Takenaka et al. | 701/29 |
| 2009/0187302 | A1* | 7/2009 | Takenaka et al. | 701/29 |
| 2009/0319114 | A1* | 12/2009 | Takenaka et al. | 701/29 |

FOREIGN PATENT DOCUMENTS

| EP | 2 210 790 | 7/2010 |
| JP | 04-252776 | 9/1992 |
| JP | 09-099826 | 4/1997 |
| JP | 11-059367 | 3/1999 |
| JP | 2000-085558 | 3/2000 |
| JP | 2003-170822 | 6/2003 |
| JP | 2004-224238 | 8/2004 |
| JP | 2006-044384 | 2/2006 |
| JP | 2007-145075 | 6/2007 |
| JP | 2008-239115 | 10/2008 |
| WO | 2008/040282 | 4/2008 |
| WO | 2009/113232 | 9/2009 |

OTHER PUBLICATIONS

"Motion and Control of Vehicle", Masahito Abe, published by Sankai-Do Co., Ltd., Apr. 10, 2003, first publication of second edition.

* cited by examiner

*Primary Examiner* — Thomas Black
*Assistant Examiner* — Peter D Nolan
(74) *Attorney, Agent, or Firm* — Rankin, Hill & Clark LLP

(57) ABSTRACT

A vehicle motion control apparatus suppresses strangeness feeling in a driver when a signal from a sensor which detects an operated state quantity of a vehicle and a motional state quantity thereof is abnormal. The vehicle motion control apparatus includes a control unit, and sensors. An actual-state-quantity obtaining unit outputs a vehicle-body actual slip angle and an actual yaw rate to a deviation calculating unit. A reference dynamic-characteristic model calculating unit calculates a vehicle-body reference slip angle and a reference yaw rate using a dynamic-characteristic model and outputs those to the deviation calculating unit. A virtual external-force calculating unit feeds back a virtual external force to the reference dynamic-characteristic model calculating unit based on a deviation output by the deviation calculating unit. At this time, a virtual-external-force-calculation controlling unit controls correction of a virtual external force based on a signal indicating a detection condition output by the sensors.

10 Claims, 6 Drawing Sheets

VEHICLE MOTION CONTROL APPARATUS

CROSS REFERENCE TO RELATED APPLICATION

This application claims the foreign priority benefit under Title 35, United States Code, §119(a)-(d) of Japanese Patent Application No. 2010-049724, filed on Mar. 5, 2010 in the Japan Patent Office, the disclosure of which is herein incorporated by reference in its entirety.

BACKGROUND OF THE INVENTION

1. Field of the Invention

The present invention relates to a vehicle motion control apparatus.

2. Description of the Related Art

JP 2003-170822A (see FIG. 6) discloses, for a driving force distribution device that distributes the driving force to the right and left wheels in order to control a vehicle yaw moment, a technology of performing yaw rate feedback control and slip angle feedback control on the driving force distribution amount based on an accelerator open quantity, an engine rotation speed, a vehicle speed, a front-wheel turning angle, a lateral direction acceleration, a yaw rate, and vehicle-body sideslip angle (may also be called a vehicle slip angle), etc.

Also, there are known a control device of controlling respective driving forces of the right and left wheels based on a vehicle slip angle in order to control a yaw moment, and a technology of correcting/controlling the front-wheel turning angle based on a vehicle slip angle.

JP 09-99826A (see FIGS. 2 to 7 and paragraphs from 0077 to 0081) discloses a control device which calculates a target yaw moment from the slip angle of a rear wheel axis and the slip-angle velocity thereof in order to control respective driving forces of the right and left wheels, thereby controlling the yaw moment of a vehicle.

US 2009/0118905A1) discloses, in FIGS. 1 and 2, a recent vehicle motion control apparatus with improvements of the turning characteristic of allowing a vehicle to turn as a driver intends, prevents the vehicle from spinning, and suppresses a false operation and an excessive control. Such a vehicle motion control apparatus includes a feedback distributing/calculating means which compensatingly calculates a virtual external force to be fed back to a motional model of the vehicle based on a deviation between a vehicle first model state quantity (corresponding to a "reference attitude-state quantity" of the present invention) based on the motional model of the vehicle and a vehicle first actual state quantity (corresponding to a "actual attitude-state quantity" of the present invention), and which calculates a yaw moment, etc., to be fed back to the driving amount of an actuator that generates a vehicular motion.

According to the vehicle motion control apparatus disclosed in US 2009/0118905 A1, the disclosure of which is herein incorporated by reference in its entirety, when a signal output by a sensor that detects a vehicle operated state quantity by a driver and the motional state quantity of the vehicle is abnormal, and when it is expected that an actual-state-quantity determining means (corresponding to an "actual attitude state determining unit" of the present invention) which detects or estimates the first actual state quantity of the vehicle based on a signal output by the sensor calculates an abnormal result, if a virtual external force calculated based on these conditions is directly fed back to the motional model of the vehicle, a difference between the first model state quantity of the vehicle and the first actual state quantity becomes large, so that the driver may feel strangeness.

SUMMARY OF THE INVENTION

The present invention may provide a vehicle motion control apparatus which does not cause a driver to feel strangeness when a signal output by a sensor that detects a vehicle operated state quantity and the motional state quantity is abnormal, and when it is expected that an actual attitude state determining unit which estimates an actual attitude-state quantity of the vehicle based on a signal output by the sensor calculates an abnormal result.

A first aspect of the present invention provides a vehicle motion control apparatus comprising:

an operated state detecting unit configured to detect an operated state quantity of a vehicle given by a driver;

a motional state detecting unit configured to detect a motional state quantity of the vehicle;

a reference attitude-state quantity calculating unit configured to calculate a reference attitude-state quantity of the vehicle corresponding to the operated state quantity of the vehicle and the motional state quantity of the vehicle based on a motional model of the vehicle in a condition in which a predetermined external force is applied to the vehicle;

an actual attitude-state setting unit configured to set an actual attitude-state quantity of the vehicle based on a detection signal from the operated state detecting unit and a detection signal from the motional state detecting unit;

an attitude-state-quantity deviation calculating unit configured to calculate a deviation between the reference attitude-state quantity of the vehicle and the actual attitude-state quantity of the vehicle;

a virtual external-force calculating unit configured to correct the external force based on the deviation calculated by the attitude-state-quantity deviation calculating unit and which feeds back the correction to the reference attitude-state quantity calculating unit;

an actuator control unit configured to set, based on the deviation calculated by the attitude-state-quantity deviation calculating unit, the drive amount of an actuator which generates a vehicular motion; and a virtual-external-force-calculation controlling unit configured to control the correction of the external force by the virtual external-force calculating unit based on a detection condition of the operated state detecting unit or the motional state detecting unit.

According to the first aspect of the present invention, the virtual-external-force-calculation controlling unit can check a detection condition of the operated state detecting unit or the motional state detecting unit. When, for example, determining that a detection signal from the operated state detecting unit or the motional state detecting unit is abnormal or when determining that calculation of a motional state quantity of the vehicle like a slow-speed-running state of the vehicle is difficult, the virtual-external-force-calculation controlling unit prohibits the virtual external-force calculating unit from correcting an external force, controls it to increase the correction or controls it to reduce the correction in accordance with the former determination.

A second aspect of the present invention provides the vehicle motion control apparatus based on the first aspect, wherein the virtual-external-force-calculation controlling unit prohibits, based on the detection condition of the operated state detecting unit or the motional state detecting unit, the virtual external-force calculating unit from correcting the external force.

According to the second aspect of the present invention, when, for example, the virtual-external-force-calculation controlling unit determines that a detection signal from the operated state detecting unit or the motional state detecting unit is abnormal or is not appropriate for calculation of a reference attitude-state quantity based on the detection condition of the operated state detecting unit or the motional state detecting unit, the virtual-external-force-calculation controlling unit prohibits the virtual external-force calculating unit from correcting the external force, thereby controlling and suppressing a difference between the actual attitude-state quantity of the vehicle and the reference attitude-state quantity thereof.

A third aspect of the present invention provides the vehicle motion control apparatus based on the first aspect, wherein the virtual-external-force-calculation controlling unit controls, based on the detection condition of the operated state detecting unit or the motional state detecting unit, the virtual external-force calculating unit to increase the correction of the external force.

According to the third aspect of the present invention, when, for example, the virtual-external-force-calculation controlling unit determines that a detection signal from the operated state detecting unit or the motional state detecting unit tends to be an abnormal value but is not abnormal yet and the correction of the external force is insufficient based on the detection condition of the operated state detecting unit or the motional state detecting unit, the virtual-external-force-calculation controlling unit controls the virtual external-force calculating unit to increase the correction of the external force in order to reduce the difference between the actual attitude-state quantity of the vehicle and the reference attitude-state quantity thereof, thereby suppressing an excessive control and a false operation.

A fourth aspect of the present invention provides the vehicle motion control apparatus based on the first aspect, wherein the virtual-external-force-calculation controlling unit controls, based on the detection condition of the operated state detecting unit or the motional state detecting unit, the virtual external-force calculating unit to reduce the correction of the external force.

According to the fourth aspect of the present invention, when, for example, the virtual-external-force-calculation controlling unit determines that a detection signal from the operated state detecting unit or the motional state detecting unit suddenly changes and the deviation between the actual attitude-state quantity of the vehicle and the reference attitude-state quantity thereof is small based on the detection condition of the operated state detecting unit or the motional state detecting unit, the virtual-external-force-calculation controlling unit controls the virtual external-force calculating unit to reduce the correction of the external force so that the correction of the external force does not become excessive, thereby controlling the difference between the actual attitude-state quantity of the vehicle and the reference attitude-state quantity thereof to be gradually reduced.

A fifth aspect of the present invention provides the vehicle motion control apparatus based on the first aspect, further comprising a detected abnormality determining unit configured to determine an abnormality of the operated state detecting unit or the motional state determining unit, wherein the actual attitude-state setting unit further includes an alternative-value calculating unit configured to calculate the actual attitude-state quantity using a predetermined alternative value, and when the detected abnormality determining unit detects an abnormality of the operated state detecting unit or the motional state detecting unit, the virtual-external-force-calculation controlling unit controls the correction of the external force by the virtual external-force calculating unit and the alternative-value calculating unit calculates the actual attitude-state quantity using the predetermined alternative value.

According to the fifth aspect of the present invention, a detected abnormality determining unit can detect an abnormality of the operated state detecting unit or the motional state detecting unit and a condition in which the detected value is not appropriate for the calculation of the reference attitude-state quantity, and the alternative-value calculating unit calculates an actual attitude-state quantity using a predetermined alternative value. However, when the predetermined alternative value is used, the alternative value of the actual attitude-state quantity, e.g., the actual yaw rate and the vehicle-body actual slip angle may have a precision decreased. In this case, the virtual-external-force-calculation controlling unit controls the virtual external-force calculating unit to reduce the correction of the external force based on the detection condition of the operated state detecting unit or the motional state detecting unit, thereby controlling and suppressing the difference between the actual attitude-state quantity of the vehicle and the reference attitude-state quantity thereof.

A sixth aspect of the present invention provides the vehicle motion control apparatus based on the second aspect, wherein when a turning angle detected by the operated state detecting unit is in a turning-angle unestimated condition, the virtual-external-force-calculation controlling unit prohibits the virtual external-force calculating unit from correcting the external force.

According to the sixth aspect of the present invention, when, for example, it is in a turning-angle unestimated condition such that a turning-angle sensor that is one of the operated state detecting units does not complete midpoint learning, the reference attitude-state quantity, e.g., a reference yaw rate and a vehicle-body reference slip angle calculated based on the motional model of the vehicle with the turning angle being as an input includes a large error. Also, the actual attitude-state quantity, e.g., the vehicle-body actual slip angle set by the actual attitude-state quantity setting unit includes an error. Hence, the correction of the external force based on the deviation between the actual attitude-state quantity of the vehicle and the reference attitude-state quantity thereof is prohibited in order to control the virtual external force not to be fed back, thereby controlling and suppressing a difference between the actual attitude-state quantity of the vehicle and the reference attitude-state quantity thereof.

A seventh aspect of the present invention provides the vehicle motion control apparatus based on the second aspect, wherein when the vehicle is in a backward running condition based on the operated state detecting unit or the motional state detecting unit, the virtual-external-force-calculation controlling unit prohibits the virtual external-force calculating unit from correcting the external force.

According to the seventh aspect of the present invention, when, for example, a select-lever position detecting sensor that is one of the operated state detecting units detects that a select lever is in a backward run position, or when a yaw rate is generated in a reverse direction relative to a turning angle and a lateral direction acceleration detected by the operated state detecting unit and the motional state detecting unit, it is determined that the vehicle is in a backward running condition. The reference attitude-state quantity, e.g., a reference yaw rate and a vehicle-body reference slip angle calculated based on the motional model of the vehicle on the basis of a premise that the vehicle runs forwardly includes a large error, so that the correction of the external force based on such reference attitude-state quantity is prohibited in order to prevent the virtual external force from being fed back, thereby controlling and suppressing a difference between the actual attitude-state quantity of the vehicle and the reference attitude-state quantity thereof.

An eighth aspect of the present invention provides the vehicle motion control apparatus based on the second aspect, wherein the motional state detecting unit includes an inclination determining unit configured to determine an inclination of a road in a lateral direction of the vehicle, and the virtual-external-force-calculation controlling unit prohibits the virtual external-force calculating unit from correcting the external force when the inclination determining unit detects an inclination angle of the road equal to or larger than a predetermined angle.

According to the eighth aspect of the present invention, when the inclination determining unit detects an inclination angle of a road equal to or larger than a predetermined angle, the virtual-external-force-calculation controlling unit prohibits the virtual external-force calculating unit from correcting the external force. Accordingly, when the inclination angle of the road (the bank angle of the road) in the lateral direction of the vehicle is equal to or larger than a predetermined angle, a yaw-rate sensor and a lateral-direction acceleration sensor included in the motional state detecting unit that detects the motional state quantity of the vehicle have a large error, but it is possible to prevent a difference between the actual attitude-state quantity of the vehicle and the reference attitude-state quantity thereof from becoming large based on such an error.

A ninth aspect of the present invention provides the vehicle motion control apparatus based on the second aspect, further comprising a slow-speed-running determining unit configured to determines whether or not a vehicle speed is equal to or slower than a predetermined speed, wherein the virtual-external-force-calculation controlling unit prohibits the virtual external-force calculating unit from correcting the external force when the slow-speed-running determining unit determines that the vehicle speed is equal to or slower than the predetermined speed.

When the vehicle runs at a speed slower than a predetermined speed, the precision of calculation of the vehicle-body actual slip angle by the actual attitude-state setting unit and the precision of calculation of the reference yaw rate and the vehicle-body reference slip angle by the reference attitude-state quantity calculating unit are likely to decrease. According to the ninth aspect of the present invention, when the slow-speed-running detecting unit detects that the vehicle is running at a speed equal to or slower than the predetermined speed, the virtual-external-force-calculation controlling unit prohibits the virtual external-force calculating unit from correcting the external force. Prohibiting the reference attitude-state quantity calculating unit from correcting a virtual external force generates a turning motion of the vehicle in accordance with the operated condition of a steering wheel by the driver, which does not cause the driver to feel strangeness.

A tenth aspect of the present invention provides the vehicle motion control apparatus based on the second aspect, further comprising a low-road-friction-coefficient determining unit that determines whether or not a friction coefficient of a road is equal to or smaller than a predetermined value, wherein the virtual-external-force-calculation controlling unit prohibits the virtual external-force calculating unit from correcting the external force when the low-road-friction-coefficient determining unit determines that the friction coefficient of the road is equal to or smaller than the predetermined value.

When the friction coefficient μ of a road is equal to or smaller than a predetermined value, e.g., when the vehicle runs on an icy road, the precision of calculation of the vehicle-body actual slip angle by the actual attitude-state setting unit and the precision of calculation of the reference yaw rate and the vehicle-body reference slip angle by the reference attitude-state quantity calculating unit are likely to decrease. Correction of the virtual external force based on the deviation obtained by the attitude-state-quantity deviation calculating unit cancels a possibility that the disturbance of the yaw moment of the vehicle inversely affects.

According to the present invention, there is provided a vehicle motion control apparatus which does not cause a driver to feel strangeness when a signal output by a sensor that detects a vehicle operated state quantity and the motional state quantity is abnormal, and when it is expected that an actual attitude state determining unit which estimates an actual attitude-state quantity of the vehicle based on a signal output by the sensor calculates an abnormal result.

DETAILED DESCRIPTION OF THE PREFERRED EMBODIMENT

An explanation will now be given of an embodiment of the present invention with reference to the accompanying drawings.

Figure 1:
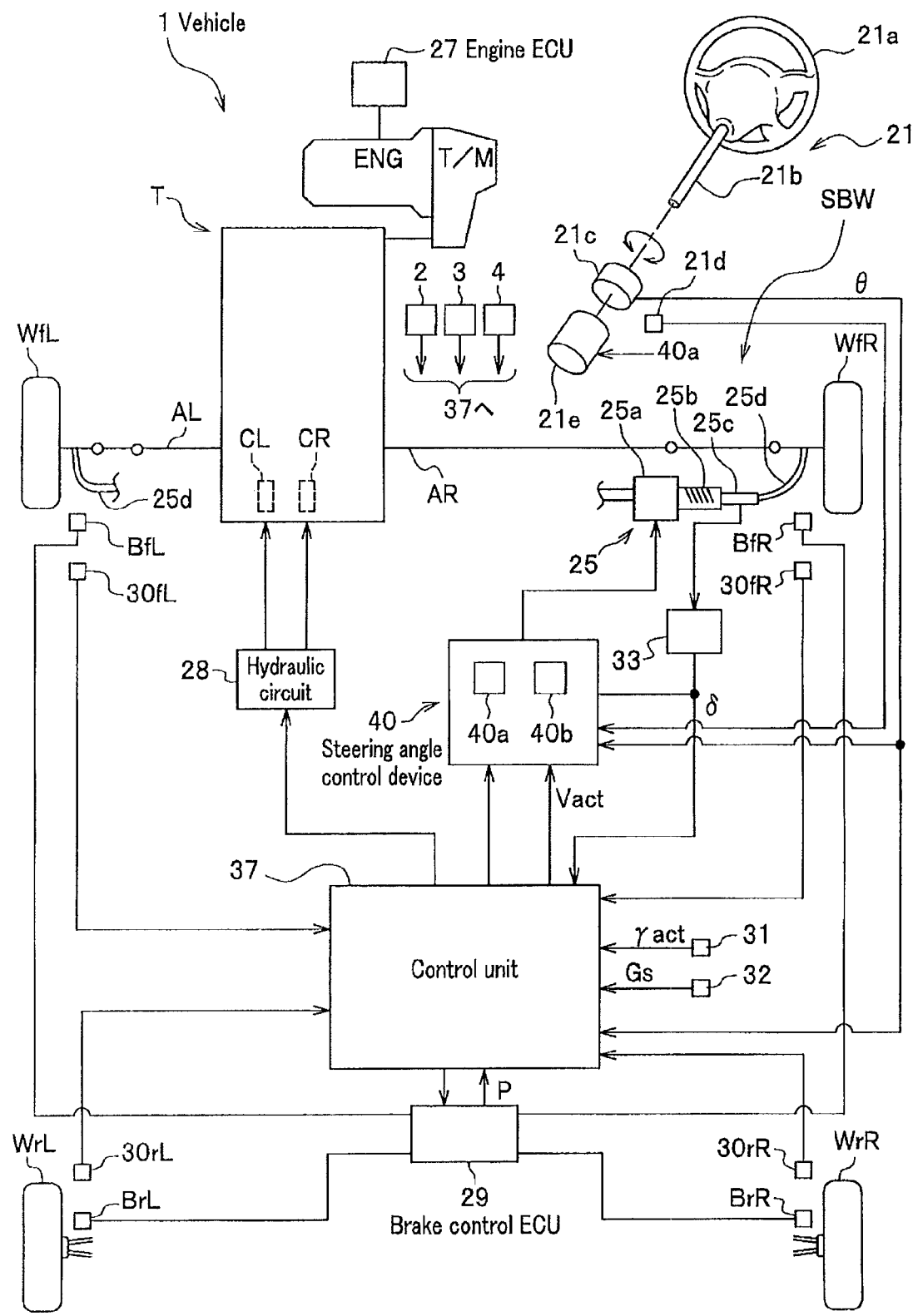
FIG. 1 is a block diagram of a vehicle including a vehicle motion control apparatus according to an embodiment of the present invention.

FIG. 1 is a block diagram of a vehicle including a vehicle motion control apparatus according to this embodiment.

Figure 2:
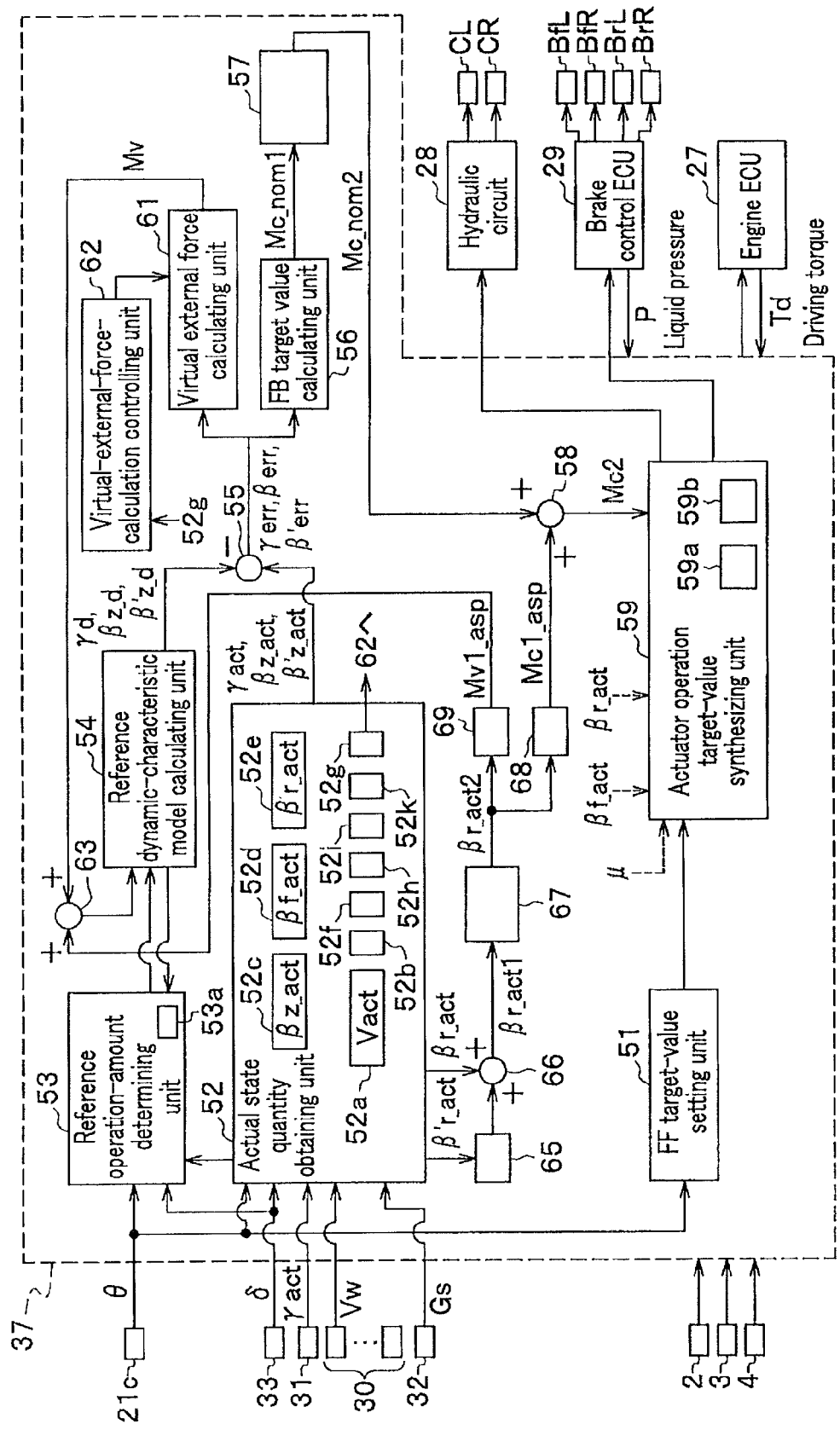
FIG. 2 is a block functional block diagram for explaining a control logic by the vehicle motion control apparatus.

FIG. 2 is a functional block diagram for explaining a control logic by the vehicle motion control apparatus.

As shown in FIG. 1, a vehicle 1 is a front-wheel drive vehicle, and includes a driving force transmitting device T and a steer-by-wire type front wheel steering device SBW.

The vehicle 1 is also includes a steering angle detecting sensor (an operated state detecting unit) 21c that detects an operation quantity (an operated state quantity of the vehicle) of a steering wheel 21a operated by a driver, a select-lever position sensor (the operated state detecting unit) 2 that detects a selected position (the operated state quantity of the vehicle) of a select lever (not shown), an acceleration pedal position sensor (the operated state detecting unit) 3 that detects the press stroke quantity of an acceleration pedal (not shown), and a brake pedal position sensor (the operated state detecting unit) 4 that detects press stroke quantity of a brake pedal (not shown).

Also, the vehicle 1 includes, as a motion control device of the vehicle 1, a control unit (a vehicle motion control apparatus) 37, a turning angle control device 40 that is a control unit for the front wheel steering unit SBW, and various sensors, such as wheel speed sensors 30fL, 30fR, 30rL, and 30rR (a motional state detecting unit) that detect respective speeds (a motional state quantity of the vehicle) of wheels WfL, WfR, WrL, and WrR, a yaw-rate sensor (the motional state detecting unit) 31 that detects an actual yaw rate (the motional state quantity) of the vehicle 1, and a lateral acceleration sensor (the motional state detecting unit) 32 that detects a lateral acceleration (the motional state quantity of the vehicle) of the vehicle 1.

The control unit 37 is for a VSA system (Vehicle Stability Assist System), and has various functions, such as an ABS (Antilock Brake System) function of cooperatively operating a brake control ECU (Electric Control Unit) 29, a TCS (Traction Control System) function of cooperatively operating a hydraulic circuit 28 and an engine ECU 27, and an AYC (Active Yaw Control) function of cooperatively operating the hydraulic circuit 28 and the brake control ECU 29.

In this embodiment, an explanation will be given focused on the feature of the AYC function. Hence, in the functional block configuration diagram of the control unit 37 shown in FIG. 2, the functional block of the ABS function and that of the TCS function are omitted.

In order to accomplish the AYC function, the control unit 37 controls the driving force transmitting device T through the hydraulic circuit 28 in order to control a motion at the time of steering, and controls respective brakes BfL, BfR, BrL, and BrR of the wheels W through the brake control ECU (Electric Control Unit) 29 in order to control the motion at the time of steering.

<Transmission System>

First, an explanation will be given of the transmission system of the vehicle 1 including the motion control device of the vehicle 1 of this embodiment. A transmission T/M is joined to the right end of an engine ENG laterally arranged at the front of a vehicle body, and the driving force transmitting device T is arranged behind the engine ENG and the transmission T/M. A left drive shaft AL and a right drive shaft AR extending to the left and the right from the left end and the right end of the driving force transmitting device T are linked with the front left wheel WfL and the front right wheel WfR which are driving wheels, respectively.

A driving force is input into the driving force transmitting device T through an input shaft extending from the transmission T/M, and comprises, for example, as is disclosed in JP 2008-239115 (see FIG. 1), a differential and a double-pinion type epicyclic gear mechanism.

The epicyclic gear mechanism of the driving force transmitting device T includes a left hydraulic clutch CL and a right hydraulic clutch CR which are controlled by the control unit 37 through the hydraulic circuit 28.

When the vehicle 1 runs straight, the left hydraulic clutch CL and the right hydraulic clutch CR are both in a non-engaged condition. When the vehicle 1 turns right, the hydraulic circuit 28 is controlled by the control unit 37, the engaging force by the right hydraulic clutch CR is adjusted accordingly, and thus the revolution speed of the front left wheel WfL is increased relative to the front right wheel WfR. When the revolution speed of the front left wheel WfL increases relative to the front right wheel WfR, some of the torque by the front right wheel WfR that is an internal turning wheel can be transmitted to the front left wheel WfL.

On the other hand, when the vehicle 1 turns left, the hydraulic circuit 28 is controlled by the control unit 37, the engaging force by the left hydraulic clutch CL is adjusted accordingly, and thus the revolution speed of the front right wheel WfR is increased relative to the revolution speed of the front left wheel WfL. When the revolution speed of the front right wheel WfR relative to the front left wheel WfL increases, some of the torque by the front left wheel WfL that is an internal turning wheel can be transmitted to the front right wheel WfR.

<Front Wheel Steering Device>

Next, an explanation will be given of the configuration of the front wheel steering device.

The front wheel steering device SBW is provided for a steer-by-wire, and includes a steering unit 21 that is a driving/operating device, a steering unit 25 that is a steering device mechanism, and a turning angle control device 40 that controls the steering unit 25.

The steering unit 21 includes a steering wheel 21a operated by the driver, the steering wheel angle θ of the steering wheel 21a is processed by the turning angle device 40, and a steering motor 25a of the steering unit 25 is driven based on the process result, thereby causing the right and left front wheels WfR, WfL to be steered.

The steering unit 21 includes the steering wheel 21a operated (steered) by the driver, a steering shaft 21b that is a rotation shaft of the steering wheel 21a, an steering wheel angle detecting sensor 21c that detects the steering wheel angle θ of the steering wheel 21a, an steering torque sensor 21d, and an operative counterforce motor 21e that improves the operability of the steering wheel 21a. The steering torque sensor 21d is a conventionally well-known sensor, detects an amount of torque input from the steering wheel 21a, and improves the response at the time of starting steering or when the direction of the right and left front wheels WfR, WfL is changed (steering). On the other hand, the steering wheel angle detecting sensor 21c comprises a conventionally well-known sensor that detects a rotation position of the steering shaft 21b by an operation of the steering wheel 21a given by the driver, and outputs the steering wheel angle θ of the steering wheel 21a as a voltage value. The turning angle control device 40 uses the output by the steering wheel angle detecting sensor 21c to set the turning angle of the right and left front wheels WfR, WfL.

Another end of the steering shaft 21b is connected to the rotation shaft of the operative counterforce motor 21e. The operative counterforce motor 21e receives a signal from the turning angle control device 40, generates a counterforce (an operative counterforce) having a direction different from the operated direction of the steering wheel 21a (the motion of the steering wheel 21a) and having a predetermined magnitude in accordance with a rotation position of the steering wheel 21a and the operated direction thereof, thereby improving the operability of a steering operation and the precision thereof.

Turning of the right and left front wheels WfR, WfL is performed by the steering unit 25 which converts the rotation of the steering motor 25a into a linear motion of a rack shaft 25c through, for example, a ball screw mechanism 25b, and which further converts such a linear motion to a steering motion of the right and left front wheels WfR, WfL through tie rods 25d, 25d.

The position of the rack shaft 25c at the time of liner motion is detected by a turning-angle sensor (the operated state detecting unit) 33 provided at the steering unit 25 as a turning angle δ (the operated state quantity of the vehicle), and is fed back to the turning angle control device 40.

Each wheel WfL, WfR, WrL, and WrR is provided with each wheel speed sensor 30fL, 30fR, 30rL, and 30rR which detects a wheel speed, and such a detected wheel speed is input into the control unit 37.

A vehicle speed calculating unit (the motional state detecting unit) 52a (see FIG. 2) of the control unit 37 calculates a vehicle speed Vact from the input wheel speeds, and inputs the vehicle speed Vact to the turning angle control device 40.

Each wheel WfL, WfR, WrL, and WrR is provided with each brake BfL, BfR, BrL, and BrR which is controlled by the brake control ECU 29.

The left hydraulic clutch CL, the right hydraulic clutch CR, and the brakes BfL, BfR, BrL, and BrR are "actuators".

<Turning Angle Control Device>

The turning angle control device 40 comprises an ECU (Electronic Control Unit) including a CPU (Central Processing Unit), a ROM (Read Only Memory), a RAM (Random Access Memory), and predetermined electric circuits, and as shown in FIG. 1, is electrically coupled to the steering unit 21 and the steering unit 25 through signal transmitting cables.

The turning angle control device 40 receives detection signals from the steering angle detecting sensor 21c of the steering unit 21 and the steering torque sensor 21d thereof, and a signal indicating the vehicle speed Vact from the vehicle speed calculating unit 52a (see FIG. 2), and sets a front wheel target turning angle at which the front wheels WfL, WfR are directed in a desired direction. Also, the turning angle control device 40 includes a target turning angle setting/operating counterforce control unit 40a that controls the operative counterforce motor 21e of the steering unit 21, and a steering motor control unit 40b that drives the steering motor 25a.

The turning angle control device 40 has the same configuration as one shown in FIG. 2 of JP 2004-224238A.

<Configuration of Vehicle Motion Control Apparatus>

Next, an explanation will be given of a control logic by the control unit 37 which causes the driving force transmitting device T to control a driving torque to each of the right and left front wheels WfR, WfL through the hydraulic circuit 28, and which controls a braking force to each wheel WfL, WfR, WrL, and WrR through the brake control ECU 29, thereby controlling a yaw moment around the weighted center of the vehicle 1 with reference to FIG. 2 and FIG. 1 as needed.

The control unit 37 comprises an ECU including a CPU, a ROM, a RAM, and predetermined electric circuits. As shown in FIG. 1, the control unit 37 is electrically coupled to the turning angle control device 40 through signal transmitting cables. Also, as shown in FIG. 1, the control unit 37 is electrically coupled to the hydraulic circuit 28 and the brake control ECU 29 through signal transmitting cables, and also coupled to the engine ECU 27 through a communication line which is not illustrated in the figure. The engine ECU 27 inputs signals indicating a driving torque to each front wheel WfL, WfR that are driving wheels, a selected position of the select lever, and an acceleration pedal position to the control unit 37. The brake control ECU 29 inputs each liquid pressure PfL, PfR, PrL, and PrR of each brake (in FIG. 2, a single liquid pressure P comprehensively represents those) to the control unit 37.

The engine ECU 27 also has a function of controlling the reduction ratio of the transmission T/M.

The control unit 37 includes, as functional blocks, a feed-forward target value setting unit 51 (hereinafter, referred to as an "FF target value setting unit 51"), an actual-state-quantity obtaining unit (the motional state detecting unit, an actual attitude state determining unit) 52, a reference operation-amount determining unit 53, a reference dynamic-characteristic model calculating unit (a reference attitude-state quantity calculating unit) 54, a deviation calculating unit (an attitude-state-quantity deviation calculating unit) 55, a feed-back-target-value calculating unit 56 (hereinafter, referred to as an "FB target value calculating unit 56"), a feedback dead-zone processing unit 57, an adder 58, an actuator operation target-value synthesizing unit (a virtual-external-force-calculation controlling unit) 59, a virtual external-force calculating unit (a virtual external-force calculating unit) 61, a virtual-external-force-calculation controlling unit 62, an adder 63, a rear-wheel actual-slip-angle correcting unit 65, an adder 66, a rear-wheel slip-angle dead-zone processing unit 67, an anti-spin/target-yaw-moment feedback calculating unit 68 (hereinafter, referred to as an "anti-spin/target-yaw-moment FB unit 68"), and an anti-spin/virtual-yaw-moment feedback calculating unit 69 (hereinafter, referred to as an "anti-spin/virtual-yaw-moment FB unit 69").

The CPU of the control unit 37 executes a process of each functional block in each control process period. Each functional block of the control unit 37 will be explained below in more detail.

<<FF Target Value Setting Unit>>

The FF target value setting unit 51 reads drive/operation inputs (the operated state quantity of the vehicle), such as the steering wheel angle θ of the steering wheel 21a, the selected position of the select lever, the press stroke amount of the acceleration pedal, and the press stroke amount of the brake pedal, and the vehicle speed Vact calculated by the vehicle speed calculating unit 52a of the actual-state-quantity obtaining unit 52, and sets each FF target value of each brake BfL, BfR, BrL, and BrR, each of the right and left hydraulic clutches CL, CR, and the reduction ratio of the transmission, etc.

The FF target value setting unit 51 sets, as is disclosed in US 2009/0118905 A1, paragraphs from 0382 to 0387, and (FIG. 17), FF target values of braking forces to the wheels WfL, WfR, WrL, and WrR, and FF target values of driving forces to the right and left front wheels WfR, and WfL. More specifically, as FF target values, an FF target first wheel brake driving/braking force by the brake BfL, an FF target second wheel brake driving/braking force by the brake BfR, an FF target third wheel brake driving/braking force by the brake BrL, and an FF target fourth wheel brake driving/braking force by the brake BrR are calculated and set to the wheels, WfL WfR, WrL, and WrR, respectively.

Also, as the FF target values, an FF target first wheel driving system driving/braking force by the left hydraulic clutch CL and an FF target second wheel driving system driving/braking force by the right hydraulic clutch CR may be calculated and set to the wheels WfL, WfR, respectively. Furthermore, as the FF target value, an FF target mission reduction ratio may be calculated and set to the transmission TIM.

<<Actual-State-Quantity Obtaining Unit>>

Next, the actual-state-quantity obtaining unit 52 obtains selected position signal from a select-lever position sensor 2, a signal indicating a press stroke amount from an acceleration pedal position sensor 3, a signal indicating a press stroke amount from a brake pedal position sensor 4, a signal indicating the steering wheel angle θ of the steering wheel 21a from the steering wheel angle detecting sensor 21c, a signal indicating an actual yaw rate γact of the vehicle 1 from a yaw-rate sensor 31, a signal indicating a lateral direction acceleration Gs of the vehicle 1 from a lateral-direction acceleration sensor 32, a signal indicating the wheel speed Vw from each of the four wheel speed sensors 30 (in this embodiment, 30fL, 30fR, 30rL, and 30rR as shown in FIG. 1), and a signal indicating the turning angle δ from the turning-angle sensor 33, etc.

The actual-state-quantity obtaining unit 52 includes, as functional blocks, the vehicle speed calculating unit (the motional state detecting unit) 52a, a friction coefficient estimation calculating unit (the motional state detecting unit) 52b, a vehicle-body actual-slip-angle calculating unit (the actual attitude state determining unit) 52c, a front-wheel actual-slip-angle calculating unit (the actual attitude state determining unit) 52d, a rear-wheel actual-slip-angle calculating unit (the actual attitude state determining unit) 52e, an actual-slip-angle velocity calculating unit (the actual attitude state determining unit) 52f, an actual-state-quantity determining unit (the virtual-external-force-calculation controlling unit, and a detected abnormality determining unit) 52g, an alternative value calculating unit (the actual attitude state determining unit, and an alternative value calculating unit) 52h, a time characteristic setting unit (the actual attitude state determining unit) 52i, and a bank angle estimation calculating unit (an inclination determining unit) 52k.

The actual-state-quantity obtaining unit 52 further includes a yaw rate midpoint learning and correcting unit that is a functional block which obtains a detected signal from the yaw-rate sensor 31, performs midpoint learning, and outputs the actual yaw rate γact corrected with a condition in which no right and left yaw rate is generated being as a zero point to the other functional blocks in the actual-state-quantity obtaining unit 52, and a turning angle midpoint learning and correcting unit that is a functional block which obtains a detected signal from the turning-angle sensor 33, performs midpoint learning, and outputs the turning angle δ corrected with a neutral condition (the condition in which the vehicle 1 travels straight) being as a zero point to the other functional blocks in the actual-state-quantity obtaining unit 52. However, such functional blocks are omitted in FIG. 2.

The actual yaw rate γact corrected by the midpoint learning is input into the deviation calculating unit 55.

<Vehicle Speed Calculating Unit>

The vehicle speed calculating unit 52a calculates the vehicle speed Vact (the motional state quantity of the vehicle) based on each wheel speed Vw from each wheel speed sensor 30 through a conventionally well-known scheme as is disclosed in, for example, JP 2000-85558A. In particular, when the brake pedal is not operated, the average value of respective wheel speeds Vw indicated by the wheel speed sensors 30rL, 30rR of the rear wheels WrL, WrR which are the follower wheels is the vehicle speed Vact. The vehicle speed calculating unit 52a also calculates the slip ratio of each wheel W based on each wheel speed Vw and the vehicle speed Vact from each wheel speed sensor 30.

In this embodiment, the present invention is not limited to an embodiment of calculating the vehicle speed Vact from the wheel speed sensors 30fL, 30fR, 30rL, and 30rR, and the vehicle 1 may have a conventionally well-known vehicle speed sensor which directly detects a ground speed independently from the wheel speed sensors 30fL, 30fR, 30rL, and 30rR, and the actual-state-quantity obtaining unit 52 may obtain a signal indicating the vehicle speed Vact from the vehicle speed sensor.

<Friction Coefficient Estimation Calculating Unit>

The friction coefficient estimation calculating unit 52b estimates and calculates a road friction coefficient μ that is a parameter of the motional state quantity of the vehicle based on the lateral direction acceleration Gs, the actual yaw rate γact, the tire characteristics (a wheel actual slip angle/cornering force characteristic, a wheel-W slip ratio-cornering force reduction rate characteristic, a wheel-W slip ratio-braking/driving characteristic) for each wheel W from the tire characteristic setting unit 52i, the wheel slip ratio, a slip angle βf_act of the front wheels WfL, WfR calculated by the front-wheel actual-slip-angle calculating unit 52d, and a slip angle βr_act of the rear wheels WrL, WrR calculated by the rear-wheel actual-slip-angle calculating unit 52e, etc., through the conventionally well-known scheme disclosed in, for example, JP 2000-85558A.

Figure 3:
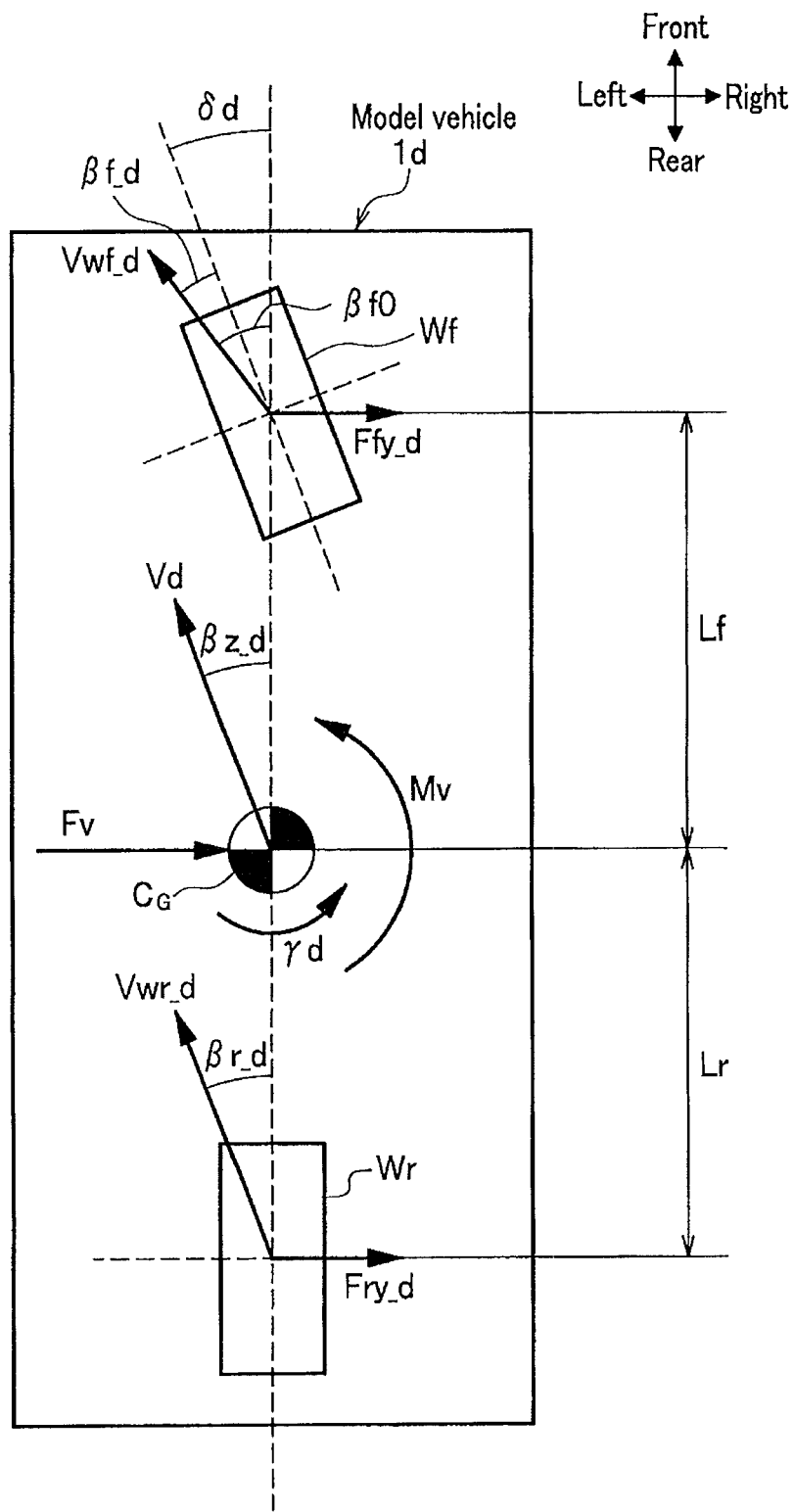
FIG. 3 is an explanatory diagram for reference symbols on a model vehicle considered over a vehicular dynamic-characteristic model.

The tire characteristic setting unit 52i corresponds to the tire characteristic setting means (12) disclosed in JP 2000-85558A, paragraph (0013) and (FIG. 3).

As is disclosed in JP 2007-145075A, paragraphs from 0029 to 0032, the friction coefficient estimation calculating unit 52b may calculate the braking force to each wheel W based on each liquid pressure P of each of the brakes BfL, BfR, BrL, and BrR of each wheel W, and may estimate and calculate the road friction coefficient μ based on the braking force of each wheel W, the angular speed of each wheel W, the radius of each wheel W, the moment of inertia of each wheel W, and the grounded load of each wheel W.

The friction coefficient estimation calculating unit 52b outputs the result of the estimated road friction coefficient μ to the actual-state-quantity determining unit 52g.

<Vehicle-Body Actual-Slip-Angle Calculating Unit>

The vehicle-body actual-slip-angle calculating unit 52c estimates and calculates a vehicle-body actual slip angle (the actual attitude-state quantity of the vehicle) βz_act based on the turning angle δ, the actual yaw rate γact, the lateral direction acceleration Gs, the vehicle speed Vact, and the slip ratio of each wheel W, etc., through a conventionally well-known scheme disclosed in, for example, JP 2000-85558A. As shown in FIG. 3, the vehicle-body actual slip angle βz_act is a vehicle-body slip angle on the weighted center of the vehicle 1, and is often called a vehicle-body slip angle. In order to distinguish the vehicle-body slip angle from a vehicle-body reference slip angle βz_d that is a vehicle-body slip angle around the weighted center calculated by the reference dynamic-characteristic model calculating unit 54, the former vehicle-body slip angle is referred to as the vehicle-body slip angle βz_act.

The vehicle-body slip angle βz_act estimated and calculated by the vehicle-body actual-slip-angle calculating unit 52c is input into the deviation calculating unit 55.

<Front-Wheel Actual-Slip-Angle Calculating Unit>

The front-wheel actual-slip-angle calculating unit 52d calculates an actual slip angle βf_act (hereinafter, simply referred to as a "front-wheel actual slip angle (the attitude-state quantity of the vehicle) βf_act") of the front wheels WfL, WfR based on the vehicle-body actual slip angle βz_act, the actual yaw rate γact, the vehicle speed Vact, and the turning angle δ through a conventionally well-known scheme. Also, the rear-wheel actual-slip-angle calculating unit 52e calculates an actual slip angle βr_act (hereinafter, simply referred to as a "rear-wheel actual slip angle (the attitude-state quantity of the vehicle) βr_act") of the rear wheels WrL, WrR, based on the vehicle-body actual slip angle βz_act, the actual yaw rate γact, and the vehicle speed Vact through a conventionally well-known scheme.

For example, the front-wheel actual slip angle βf_act can be calculated through a following equation (1), and the rear-wheel actual slip angle βr_act can be calculated through a following equation (2).

$$\beta f\_act = \beta z\_act + Lf \cdot \gamma act / Vact - \delta \quad (1)$$

$$\beta r\_act = \beta z\_act - Lr \cdot \gamma act / Vact \quad (2)$$

where Lf is a distance between the weighted center of the vehicle 1 and respective drive shafts AL, Ar of the front wheels WfL, WfR in the back-and-forth direction, and Lr is a distance between the weighted center of the vehicle 1 and respective rotational axes of the rear wheels WrL, WrR in the back-and-forth direction (see FIG. 3).

The front-wheel actual slip angle βf_act calculated by the front-wheel actual-slip-angle calculating unit 52*d* is input into the actuator operation target-value synthesizing unit 59.

The rear-wheel actual slip angle βr_act calculated by the rear-wheel actual-slip-angle calculating unit 52*e* is input into the adder 66 and the actuator operation target-value synthesizing unit 59.

<Actual-Slip-Angle Velocity Calculating Unit>

The actual-slip-angle velocity calculating unit 52*f* performs time differentiation based on the last vehicle-body actual slip angle βz_act periodically calculated by the vehicle-body actual-slip-angle calculating unit 52*c* and the current vehicle-body actual slip angle βz_act in order to calculate a vehicle-body actual-slip-angle velocity (the actual attitude-state quantity of the vehicle) β'act. The vehicle-body actual-slip-angle velocity β'act calculated by the actual-slip-angle velocity calculating unit 52*f* is input into the deviation calculating unit 55.

Also, the actual-slip-angle velocity calculating unit 52*f* performs time differentiation based on the last rear-wheel actual slip angle βr_act periodically calculated by the rear-wheel actual-slip-angle calculating unit 52*d* and the current rear-wheel actual slip angle βr_act in order to calculate a rear-wheel actual-slip-angle velocity (the actual attitude-state quantity of the vehicle) β'r_act. The rear-wheel actual-slip-angle velocity β'r_act calculated by the actual-slip-angle velocity calculating unit 52*f* is input into the rear-wheel actual-slip-angle correcting unit 65.

<Bank Angle Estimating Unit>

The bank angle estimating unit 52*k* estimates a bank angle based on the lateral direction acceleration Gs, and the actual yaw rate γact through a conventionally well-known method like one disclosed in JP 11-59367A, paragraph 0094.

<Actual-State-Quantity Determining Unit>

Next, an explanation will be given of the function of the actual-state-quantity determining unit 52*g*.

The actual-state-quantity determining unit 52*g* monitors signals from the above-explained various sensors, such as the select-lever position sensor 2, the acceleration pedal position sensor 3, the brake pedal position sensor 4, the wheel speed sensors 30*f*L, 30*f*R, 30*r*L, and 30*r*R, the yaw-rate sensor 31, the lateral-direction acceleration sensor 32, and the turning-angle sensor 33, and outputs, as needed, a control instruction to the alternative value calculating unit 52*h* and a control instruction to the virtual-external-force-calculation controlling unit 62.

In estimation and calculation of the vehicle-body actual slip angle βz_act by the vehicle-body actual-slip-angle calculating unit 52*c*, the actual yaw rate γact and the turning angle δ are important factors.

Hence, the actual-state-quantity determining unit 52*g* monitors detected signals from the yaw-rate sensor 31 and the turning-angle sensor 33. When determining that the yaw-rate sensor 31 breaks down, the actual-state-quantity determining unit 52*g* inputs an instruction signal to the vehicle-body actual-slip-angle calculating unit 52*c* in order to terminate its calculation, causes the alternative value calculating unit 52*h* to calculate an alternative value γalt for the actual yaw rate γact and an alternative value βz_alt for the vehicle-body actual slip angle βz_act. Also, the actual-state-quantity determining unit 52*g* instructs the front-wheel actual-slip-angle calculating unit 52*d* and the rear-wheel actual-slip-angle calculating unit 52*e* to calculate the actual lateral slip angle βf_act of the front wheels WfL, WfR, and the actual slip angle βr_act of the rear wheels WrL, WrR, respectively, using the alternative value γalt and the alternative value βz_alt. Likewise, when determining that the turning-angle sensor 33 breaks down, the actual-state-quantity determining unit 52*g* inputs an instruction signal to the vehicle-body actual-slip-angle calculating unit 52*c* in order to terminate its calculation, causes the alternative value calculating unit 52*h* to calculate an alternative value γalt for the actual yaw rate γact and an alternative value βz_alt for the vehicle-body actual slip angle βz_act. Also, the actual-state-quantity determining unit 52*g* instructs the front-wheel actual-slip-angle calculating unit 52*d* and the rear-wheel actual-slip-angle calculating unit 52*e* to calculate the actual lateral slip angle βf_act of the front wheels WfL, WfR, and the actual slip angle βr_act of the rear wheels WrL, WrR, respectively, using the alternative value γalt and the alternative value βz_alt.

Next, when determining that the yaw-rate sensor 31, the lateral-direction acceleration sensor 32, the turning-angle sensor 33, etc., break down, the actual-state-quantity determining unit 52*g* inputs a flag signal indicating a defect determined result of each sensor to the virtual-external-force-calculation controlling unit 62, and causes the virtual-external-force-calculation controlling unit 62 to perform control in accordance with such a defect condition. This control will be discussed later together with an explanation for FIG. 6.

Also, the actual-state-quantity determining unit 52*g* detects an abrupt operation of the steering wheel 21 given by the driver while the vehicle 1 is running at a forward speed equal to or larger than a predetermined value (i.e., the absolute value of an steering wheel angle speed θ' that is a time differentiation of the steering wheel angle θ is equal to or larger than a predetermined value) based on the position signal from the select-lever position sensor 2, the signal indicating the steering wheel angle θ from the steering wheel angle detecting sensor 21*c*, and the vehicle speed Vact calculated by the vehicle speed calculating unit 52*a*. Next, the actual-state-quantity determining unit 52*g* outputs a steering-wheel sudden-operation flag signal indicating that the steering wheel 21*a* is being operated abruptly to the virtual-external-force-calculation controlling unit 62 for a predetermined time period after the detection of abrupt steering, or until a predetermined time period elapses after no lateral direction acceleration Gs equal to or larger than a predetermined value is detected further after the detection of such abrupt steering.

Also, the actual-state-quantity determining unit 52*g* monitors the above-explained not shown yaw rate midpoint learning and correcting unit, and turning angle midpoint learning and correcting unit, checks whether or not learning of the midpoint of the actual yaw rate γact and that of the turning angle δ has completed, and when learning of such midpoint has not completed yet, inputs a flag signal indicating that learning of such midpoint has not completed yet to the virtual-external-force-calculation controlling unit 62.

Also, the actual-state-quantity determining unit 52*g* determines whether the vehicle 1 is stopping, the vehicle 1 is running backward, or the vehicle 1 is running at a slow speed slower than a predetermined speed based on the position signal from the select-lever position sensor 2 and the vehicle speed Vact calculated by the vehicle speed calculating unit 52*a*, and outputs a stopping flag signal, a backward-running flag signal, and a slow-speed-running flag signal each indicating each condition to the virtual-external-force-calculation controlling unit 62.

The actual-state-quantity determining unit 52*g* can detect/determine the backward running of the vehicle 1 based on a yaw-rate direction indicated by the actual yaw rate γact from the yaw-rate sensor 31, an orbital yaw rate determined on the basis of the lateral direction acceleration Gs from the lateral-direction acceleration sensor 32 and the turning angle δ from the turning-angle sensor 33, and respective signs (the directivities) of the yaw-rate direction and the orbital yaw rate, regardless of the detection of the backward running by the select lever.

The actual-state-quantity determining unit 52g monitors an output by the bank angle estimation calculating unit 52k, and when the bank angle is equal to or larger than a predetermined value, inputs a banked-road flag signal to the virtual-external-force-calculation controlling unit 62.

Also, when the result indicating the road friction coefficient μ and input from the friction coefficient estimation calculating unit 52b is equal to or smaller than a predetermined value, the actual-state-quantity determining unit 52g inputs a low μ flag signal indicating that the road friction coefficient is a small μ to the virtual-external-force-calculation controlling unit 62.

<Alternative Value Calculating Unit>

Next, an explanation will be given of the alternative value calculating unit 52h.

First, an explanation will be given of how the alternative value calculating unit 52h calculates the alternative value γalt for the actual yaw rate γact and the alternative value βz_alt for the vehicle-body actual slip angle βz_act when the actual yaw rate γact based on the detected signal from the yaw-rate sensor 31 is unavailable. There are two methods in order to calculate the alternative value. A first method (a scheme A) will be explained first.

<First Method (Scheme A)>

$$\beta z\_alt = K_\beta(Vact) \cdot \delta \quad (3A)$$

$$\gamma alt = K_\gamma(Vact) \cdot \delta \quad (4A)$$

where $K_\beta$(Vact) is a gain of the function of the vehicle speed Vact at the time of calculating the alternative value βz_alt from the turning angle δ, and $K_\gamma$(Vact) is a gain of the function of the vehicle speed Vact at the time of calculating the alternative value γalt from the turning angle δ.

<Second Method (Scheme B)>

Next, a second method (a scheme B) will be explained. The second method uses the vehicle speed Vact and the lateral direction acceleration Gs as is indicated by a following equation (5).

$$\gamma alt = \gamma_G = Gs/Vact \quad (5)$$

Also, using the calculated γalt, the alternative value γalt and the gain $K_\gamma$(Vact) are used in the equation (4A) in order to obtain an alternative value δalt of the turning angle δ through back calculation, and the alternative value δalt is substituted for the turning angle δ in the equation (3A), thereby calculating the alternative value βz_alt.

According to the second method, the explanation was given of the method of calculating the alternative value βz_alt from the equation (3A) using the alternative value δalt, but the present invention is not limited to this method. As a modified example of the scheme B, the alternative value βz_alt may be directly calculated from the equation (3A) using the turning angle δ.

The alternative value obtained from the equation (5) is often called an "orbital yaw rate" which is a yaw rate when it is presumed that the vehicle 1 is directed in the tangential line of a circle of a turn when the vehicle 1 is turning, and which is an approximation value that does not include a time change in the vehicle-body actual slip angle βz_act.

Next, an explanation will be given of how the alternative value calculating unit 52h calculates the alternative value δalt and the alternative value βz_alt when the turning angle δ based on the detected signal from the turning-angle sensor 33 is unavailable. There are two methods in order to calculate such alternative values. A first method will be explained first.

<First Method (Scheme C)>

The First method (a scheme C) uses the actual yaw rate γact and the vehicle speed Vact as is indicated by following equations (6), and (3B).

$$\delta alt = K_\delta(Vact) \cdot \gamma act \quad (6)$$

$$\beta z\_alt = K_\beta(Vact) \cdot \delta alt \quad (3B)$$

where $K_\delta$(Vact) is a gain of the function of the vehicle speed Vact at the time of calculating the alternative value δalt of the turning angle δ from the actual yaw rate γact.

<Second Method (Scheme B)>

The second method uses the above-explained scheme B. However, because the turning angle δ is unavailable, the modified example of the scheme B is also unavailable.

Meanwhile, a calculation of an alternative value Gsalt when the lateral-direction acceleration sensor 32 breaks down can be carried out as is expressed by a following equation (7).

$$Gsalt = \gamma alt \cdot Vact \quad (7)$$

Furthermore, when both yaw-rate sensor 31 and lateral-direction acceleration sensor 32 are simultaneously unavailable, the alternative value γalt can be calculated through a following equation (4B) or a following equation (4C) using the vehicle speed Vact and the wheel speed Vw.

$$\gamma alt = (V_{WR} - V_{WL})/Vact \quad (4B)$$

where $V_{WR}$ and $V_{WL}$ are, for example, respective wheel speeds of the rear wheels WrR, and WrL which are follower wheels, but as is indicated in the following equation (4C), $V_{WR}$, $V_{WL}$ may be an average wheel speed $<V_{WR}>$ of the right front and rear wheels WfR, WrR, and an average wheel speed $<V_{WL}>$ of the left front and rear wheels WfL, WrL.

$$\gamma alt = (<V_{WR}> - <V_{WL}>)/Vact \quad (4C)$$

Into the equation (7), the alternative value γalt calculated from the equation (4B) or (4C) is substituted for the γact, and thus the alternative value Gsalt of the lateral direction acceleration Gs can be obtained.

Also, the alternative value βz_alt of the vehicle-body actual slip angle βz_act can be easily calculated from the equation (3A).

The present invention is not limited to the scheme of using the alternative value γalt in the equation (4B) or (4C) when both yaw-rate sensor 31 and the lateral-direction acceleration sensor 32 are simultaneously unavailable, and it is needless to say that the equation (4A) can be used.

The alternative value β'z_alt, etc., of the vehicle-body actual slip-angle velocity βz_act calculated through a time differentiation based on the alternative value γalt of the actual yaw rate γact, and the alternative value βz_alt of the vehicle-body actual slip angle βz_act calculated by the alternative value calculating unit 52h is also included in the "actual attitude-state quantity of the vehicle". Also, when the actual-state-quantity determining unit 52g determines that there is no abnormality like the breakdown of the sensor, the actual yaw rate γact obtained by the actual-state-quantity obtaining unit 52 from the yaw rate sensor 31 is input to the deviation calculating unit 55 as an "actual attitude-state quantity of the vehicle".

<<Reference Steering-Amount Determining Unit>>

The reference steering-amount determining unit 53 determines a reference model steering amount that is an input to the above-explained reference dynamic-characteristic model calculating unit 54. According to this embodiment, the reference steering-amount determining unit 53 determines a turning angle (hereinafter, a model turning angle δd) of the front wheels WfL, WfR of the vehicle 1. In order to determine the model turning angle δd, the steering wheel angle θ (a present value) of the steering wheel 21a (see FIG. 1) is input into a main input quantity to the reference operation-amount determining unit 53, and the vehicle speed Vact (a present value) and the estimated friction coefficient μ (a present value) both calculated by the actual-state-quantity obtaining unit 52 and the state quantity (a previous value) of the vehicle 1 over the reference dynamic-characteristic model calculating unit 54 are also input into the reference operation-amount determining unit 53. Hence, the reference operation-amount determining unit 53 includes a previous-state-quantity memory unit 53a that temporarily stores the state quantity of the vehicle 1 over the reference dynamic-characteristic model calculating unit 54.

The reference operation-amount determining unit 53 determines the model turning angle δd based on those inputs. It is basically appropriate if the model turning angle δd is set in accordance with the steering angle θ. However, according to this embodiment, a predetermined restriction is given to the model turning angle δd input into the reference dynamic-characteristic model calculating unit 54. In order to establish such a restriction, in addition to the steering angle θ, the vehicle speed Vact, the estimated road friction coefficient μ, etc., are also input into the reference operation-amount determining unit 53.

The reference operation-amount determining unit 53 corresponds to the "reference operation-amount setting unit 14" disclosed in US 2009/0118905 A1, paragraphs from 0141 to 0143, etc.

<<Reference Dynamic-Characteristic Model Calculating Unit>>

Next, an explanation will be given of the reference dynamic-characteristic model calculating unit 54 with reference to FIGS. 2 and 3. FIG. 3 is an explanatory diagram for reference symbols on a model vehicle considered over a vehicular dynamic-characteristic model.

The reference dynamic-characteristic model calculating unit 54 sets and outputs a reference attitude-state quantity that is a state quantity of a reference motion of the vehicle 1 based on a vehicle dynamic-characteristic model defined beforehand. The vehicle dynamic-characteristic model represents a dynamic characteristic of the vehicle 1, and a reference attitude-state quantity is sequentially calculated based on predetermined inputs including the above-explained reference model operation amount. The reference motion of the vehicle 1 is basically an ideal motion of the vehicle 1 or a motion similar thereto which can be appropriate to the driver.

The reference dynamic-characteristic model calculating unit 54 is supplied with a result of adding the reference model operation amount set by the reference operation-amount determining unit 53a virtual external force yaw moment Mv that is a feedback control input calculated by the virtual external-force calculating unit 61, and an anti-spin/virtual FB yaw moment Mvl_asp calculated by the anti-spin/virtual-yaw-moment FB unit 69 and calculates the reference attitude-state quantity, more specifically, the reference yaw rate γd, a vehicle-body reference slip angle βz_d, etc., in chronological order based on those inputs through a repeated computation including integration.

The reference yaw rate γd is a reference attitude-state quantity relating to the rotational motion of a model vehicle 1d (see FIG. 3) on a weighted center $C_G$ (see FIG. 3) in the yaw direction used for the reference dynamic-characteristic model. The vehicle-body reference slip angle βz_d is a reference attitude-state quantity relating to a vehicle-body slip angle that is an angle defined by the back-and-forth axis of the model vehicle 1d relative to the direction of the vehicle speed Vd at the weighted center $C_G$ of the model vehicle 1d. In order to sequentially calculating those reference attitude-state quantities γd, and βz_d for each control process period, a result of adding the model turning angle (a present value) which is the reference model operation amount, the feedback control input (the virtual external force yaw moment) Mv (a previous value) and the anti-spin virtual FB yaw moment Mvl_asp (a previous amount) is input to the reference dynamic-characteristic model calculating unit 54. In this case, according to this embodiment, the vehicle speed Vd of the model vehicle 1d in the reference dynamic-characteristic model calculating unit 54 is caused to match the actual vehicle speed Vact. In order to do so, the vehicle speed Vact (a present value) calculated by the actual-state-quantity obtaining unit 52 is also input into the reference dynamic-characteristic model calculating unit 54 through the reference operation-amount determining unit 53. The reference dynamic-characteristic model calculating unit 54 calculates the reference yaw rate γd, the vehicle-body reference slip angle βz_d, and the vehicle-body reference-slip-angle velocity β'z_d of the model vehicle 1d on the reference dynamic characteristic model based on those inputs, and inputs the calculated results to the deviation calculating unit 55.

A feedback input Mv as a feedback-control input from the virtual external-force calculating unit 61 to the reference dynamic-characteristic model calculating unit 54 is a feedback-control input which is additionally input to the reference dynamic-characteristic model in order to prevent the reference motion of the model vehicle 1d from being out of (differing from) the motion of the vehicle 1 (in order to approximate the reference motion to the motion of the vehicle 1) originating from a change in the running environment (e.g., a road condition) of the vehicle 1 (a change that is not considered in the reference dynamic-characteristic model), a modeling error by the reference dynamic-characteristic model, or the detection error by each sensor, an estimation calculation error by the actual-state-quantity obtaining unit 52, etc. The feedback input Mv is a virtual external force virtually acting on the model vehicle 1d on the reference dynamic-characteristic model according to this embodiment. Also, the feedback input Mv is a virtual moment in the yaw direction which acts on the model vehicle 1d over the reference dynamic-characteristic model on the weighted center $C_G$. Hereinafter, this feedback input is referred to as a "virtual external-force yaw moment Mv".

<Reference Dynamic-Characteristic Model>

The reference dynamic-characteristic model of this embodiment will be briefly explained with reference to FIG. 3. FIG. 3 is an explanatory diagram for the model vehicle over the reference dynamic-characteristic model according to this embodiment. The model vehicle 1d (a so-called two-wheel model) represents the dynamic characteristic of the vehicle 1 through the dynamic characteristic (dynamics-based characteristic) of the vehicle 1 having a front wheel Wf and a rear wheel Wr on a plane. The front wheel Wf of the model vehicle 1d corresponds to a wheel W that combines the two actual front wheels WfL, WfR of the vehicle 1, and is a wheel of the model vehicle 1d to be steered. The rear wheel Wr corresponds to a wheel W that combines the two actual rear wheels WrL, WrR of the vehicle 1, and is a wheel not to be steered according to this embodiment.

The model vehicle 1d is conventionally well-known, and reference symbols not explained above will be explained below, and the detailed explanation will be omitted.

δd represents the turning angle, and is a reference model operation amount input into the reference dynamic-characteristic model. Vwf_d is a traveling speed vector of the front wheel Wf of the model vehicle 1d on a plane. Vwr_d is a traveling speed vector of the rear wheel Wr of the model vehicle 1d on a plane, and βf_d is a slip angle (hereinafter, referred to as a "front-wheel slip angle βf_d") of the front wheel Wf. βr_d is a slip angle (hereinafter, referred to as a "rear-wheel slip angle βr_d") of the rear wheel Wr. βf0 is an angle (hereinafter, referred to as a "vehicle front-wheel-position slip angle βf0") that is an angle of the traveling speed vector Vwf_d of the front wheel Wf of the model vehicle 1d relative to the back-and-forth axis of the model vehicle 1d.

More specifically, the dynamic characteristic of the model vehicle 1d is expressed by a following equation (8).

A equation excluding the third term (a term including Mv) of the right side of the equation (8) is the same as conventionally well-known equations (3.12), (3.13) disclosed in a conventionally well-known document (Masahito Abe, published by SANKAI-DO Co., Ltd., Apr. 10, 2003, first publication of second edition. This document is referred to as a non-patent literature 1 below) with a title of "Motion and Control of Vehicle".

$$\frac{d}{dt}\begin{bmatrix}\beta_{z\_d}\\ \gamma_d\end{bmatrix}=\begin{bmatrix}a11 & a12\\ a21 & a22\end{bmatrix}*\begin{bmatrix}\beta_{z\_d}\\ \gamma_d\end{bmatrix}+\begin{bmatrix}b1\\ b2\end{bmatrix}*\delta_d+\begin{bmatrix}b11 & 0\\ 0 & b22\end{bmatrix}*\begin{bmatrix}0\\ Mv\end{bmatrix} \quad (8)$$

where $$a11=-\frac{2*(K_f+K_r)}{m*V_d}$$

$$a12=-\frac{m*V_d^2+2*(L_f*K_f-L_r*K_r)}{m*V_d^2}$$

$$a21=-\frac{2*(L_f*K_f-L_r*K_r)}{I}$$

$$a22=-\frac{2*(L_f^2*K_f+L_r^2*K_r)}{I*V_d}$$

$$b1=\frac{2*K_f}{m*V_d}$$

$$b2=\frac{2*L_f*K_f}{I}$$

$$b11=\frac{1}{m*V_d}$$

$$b22=\frac{1}{I}$$

where:

m is a total mass of the model vehicle 1d;

Kf is a cornering power per wheel when the front wheel Wf of the model vehicle 1d is treated as the coupled body of the two right and left front wheels WfR, WfL (see FIG. 1);

Kr is a cornering power per wheel when the rear wheel Wr of the model vehicle 1d is treated as the coupled body of the two right and left rear wheels WrR, WrL (see FIG. 1);

Lf is a distance in the back-and-forth direction between the center of the front wheel Wf of the model vehicle 1d and the weighted center $C_G$;

Lr is a distance in the back-and-forth direction between the center of the rear wheel Wr of the model vehicle 1d and the weighted center $C_G$; and I is a moment of inertia of the model vehicle 1d around the yaw axis at the weighted center $C_G$.

The values of these parameters are set beforehand. In this case, for example, m, I, Lf, and Lr are the same values as those of the vehicle 1, or set to be substantially same as those of the vehicle 1. Also, Kf, and Kr are set in consideration of the characteristics of the tires of the front wheels WfL, WfR of the vehicle 1 and the rear wheels WrL, WrR thereof.

d(βz_d)/dt in the equation (8) is the vehicle-body reference slip-angle velocity β'z_d of the model vehicle 1d.

The dynamic characteristic model of the model vehicle 1d in this embodiment corresponds to the dynamic characteristic model disclosed in US 2009/0118905 A1, paragraphs from 0171 to 0181. Also, the virtual external-force yaw moment Mv of this embodiment corresponds to the "virtual external force Mvir" in US 2009/0118905 A1. Regarding the "virtual external force Fvir" in US 2009/0118905 A1, it is presumed in this embodiment that such a force is "0 (zero)", and the feedback of such a virtual external force is out of consideration. Accordingly, the detailed explanation thereof will be omitted in this specification.

<<Deviation Calculating Unit>>

Next, returning to FIG. 2, an explanation will be given of the deviation calculating unit 55.

The deviation calculating unit 55 calculates respective deviations γerr, βerr, and β'err between the actual yaw rate γact, the vehicle-body actual slip angle βz_act, and the vehicle-body actual slip-angle velocity β'z_act which are the actual attitude-state quantities input from the actual-state-quantity obtaining unit 52 and the reference yaw rate γd, the vehicle-body reference slip angle βz_d, and the vehicle-body reference-slip-angle velocity β'z_d which are reference attitude-state quantities input from the reference dynamic-characteristic model calculating unit 54, respectively. The deviation calculating unit 55 inputs the calculated deviations to the feedback-target-value calculating unit 56 and the virtual external-force calculating unit 61. The deviations γerr and βerr are calculated from following equations (9), (10A), and (10B).

$$\gamma err=\gamma act-\gamma d \quad (9)$$

$$\beta err=\beta z\_act-\beta z\_d \quad (10A)$$

$$\beta' err=\beta' z\_act-\beta' z\_d \quad (10B)$$

<<FB-Target-Value Calculating Unit>>

The FB-target-value calculating unit 56 performs yaw moment control around the weighted center of the vehicle 1 through the brake control ECU 29 based on the deviations γerr, and βerr by distributing the right and left braking forces to the front wheels WfR, WfL and the rear wheels WrR, and WrL, or calculates, from a following equation (11), a reference FB target-yaw-moment Mc_nom1 at the time of distributing the right and left driving forces of the front wheels WfR, WfL which are driving wheels through the hydraulic circuit 28, and inputs the calculated result to the feedback dead-zone processing unit 57.

$$Mc\_nom1=K_1 \cdot \gamma err+K_2 \cdot \beta err+K_3 \cdot \beta' err \quad (11)$$

where $K_1$, $K_2$, and $K_3$ are feedback gains set beforehand.

<<Feedback Dead-Zone Processing Unit>>

Figure 4:
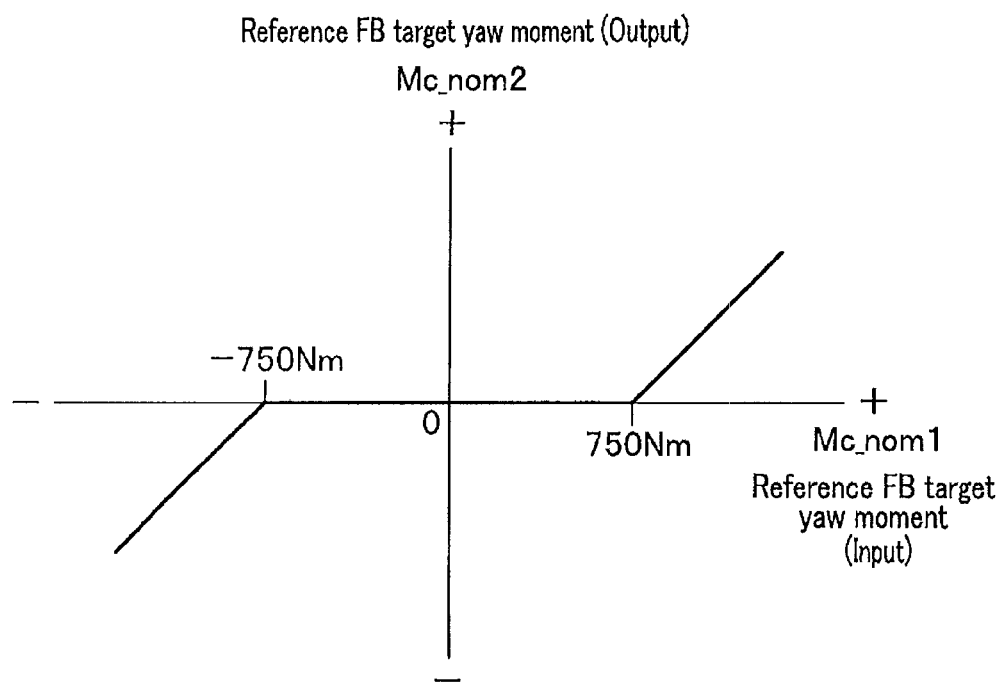
FIG. 4 is an explanatory diagram for a feedback dead-zone processing unit

As shown in FIG. 4, the feedback dead-zone processing unit 57 sets a dead-zone (invariable-zone) of, for example, ±750 Nm (Newton meter) relative to the input reference FB target-yaw-moment Mc_nom1, and processes a reference FB target-yaw-moment Mc_nom2 as an output. By setting the dead-zone to the reference FB target-yaw-moment Mc_nom2 output relative to the input reference FB target-yaw-moment Mc_nom1, yaw moment control is always fed back to the slight deviations γerr, βerr, so that a stable yaw moment is enabled which does not cause the driver and a passenger to feel uncomfortability.

The reference FB target-yaw-moment Mc_nom2 output by the feedback dead-zone processing unit 57 is input to the adder 58.

<<Anti-Spin/Target-Yaw-Moment FB Control>>

Next, returning to FIG. 2, an explanation will be given of the anti-spin/target-yaw-moment FB (feedback) by the rear-wheel actual-slip-angle correcting unit 65, the adder 66, the rear-wheel slip-angle dead-zone processing unit 67, and the anti-spin target-yaw-moment FB unit 68, etc. Through this control, in order to prevent the vehicle 1 (see FIG. 1) from spinning due to over-steering, an anti-spin/FB target-yaw-moment Mc1_asp is calculated through a equation (12) to be discussed later at the time of performing yaw moment control on the weighted center of the vehicle 1 through the brake control ECU 29 by distributing the right and left braking forces to the front wheels WfR, WfL and the rear wheels WrR, WrL, or through the hydraulic circuit 28 by distributing the right and left driving forces of the front wheels WfR, WfL which are driving wheels. The calculated anti-spin/FB target-yaw-moment Mc1_asp is input into the adder 58.

The rear-wheel actual-slip-angle correcting unit 65 multiplies a rear-wheel actual-slip-angle velocity β'r_act calculated by the actual-slip-angle velocity calculating unit 52f of the actual-state-quantity obtaining unit 52 by a constant $K_4$, and inputs the multiplication result to the adder 66. The adder 66 adds the input result and the rear-wheel actual slip angle βr_act calculated by the rear-wheel actual-slip-angle calculating unit 52e in order to obtain an actual rear-wheel slip angle βr_act1, and inputs the rear-wheel actual slip angle βr_act1 to the rear-wheel slip-angle dead-zone processing unit 67.

Figure 5:
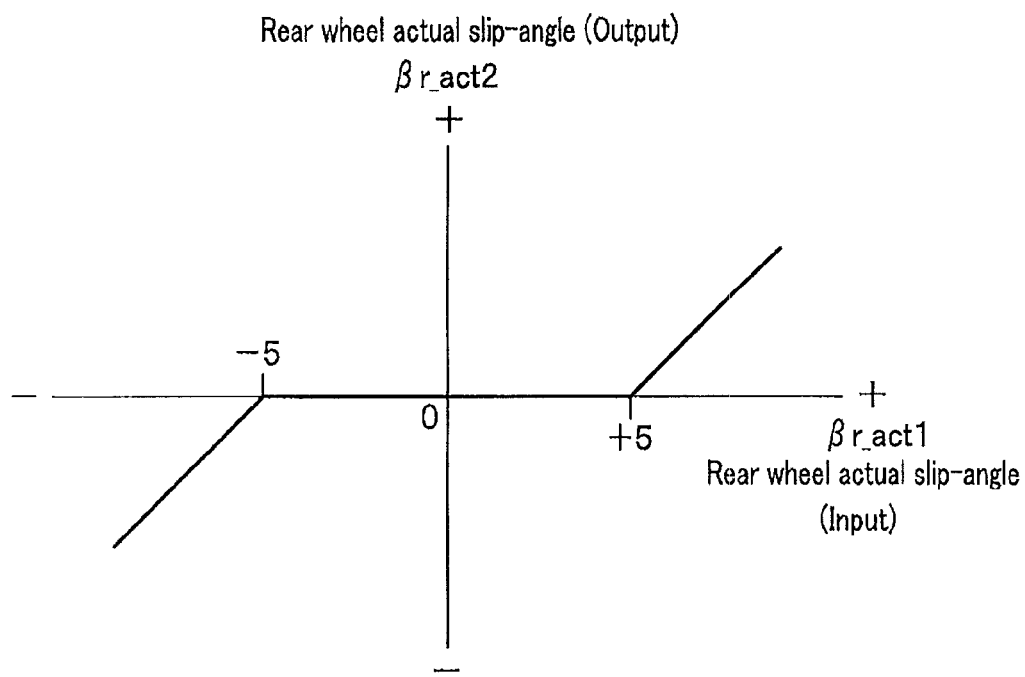
FIG. 5 is an explanatory diagram for a rear-wheel slip-angle dead-zone processing unit.

The rear-wheel slip-angle dead-zone processing unit 67 sets a dead-zone (invariable zone) of, for example, ±5 degrees relative to the input rear-wheel actual slip angle βr_act1 as shown in FIG. 5, and inputs and processes a rear-wheel actual slip angle βr_act2. By setting the dead-zone to the rear-wheel actual slip angle βr_act2 output relative to the input rear-wheel actual slip angle βr_act1, a feedback quantity of the anti-spin/target-yaw-moment control for suppressing a spin of the vehicle 1 (see FIG. 1) originating from over-steering changes relative to the slight change in the rear-wheel actual slip angle βr_act1, and such a change in the feedback quantity is input for accomplishing a stable anti-spin/target-yaw-moment control which does not cause the driver and the passenger to feel uncomfortability.

The rear-wheel actual slip angle βr_act2 output by the rear-wheel slip-angle dead-zone processing unit 67 is input to the anti-spin/target-yaw-moment FB unit 68.

The anti-spin/target-yaw-moment FB unit 68 calculates an anti-spin/FB target-yaw-moment Mc1_asp from the following equation (12), and outputs the calculation result to the adder 58.

$$Mc1\_asp = K_5 \cdot \beta r\_act2 \quad (12)$$

where $K_5$ is a feedback gain set beforehand.

The adder 58 adds the reference FB target-yaw-moment Mc_nom2 input from the feedback dead-zone processing unit 57 and the anti-spin/FB target-yaw-moment Mc1_asp input from the anti-spin/target-yaw-moment FB unit 68 in order to obtain a FB target-yaw-moment Mc2, and inputs the FB target-yaw-moment Mc2 to the actuator operation target-value synthesizing unit 59.

The larger the absolute value of the rear-wheel actual-slip-angle velocity β'r_act is, the more the vehicle 1 is in an over-steered condition. In order to suppress such an over-steered condition, the adder 66 adds a result obtained by multiplying the rear-wheel actual-slip-angle velocity β'r_act by the constant $K_4$ at the rear-wheel actual-slip-angle correcting unit 65 and the rear-wheel actual slip angle βr_act.

<<Actuator Operation Target-Value Synthesizing Unit>>

Input to the actuator operation target-value synthesizing unit 59 are signals indicating the deceleration of the transmission T/M, such as an engine torque, an engine rev speed, etc., from the engine ECU 27, a signal from the acceleration pedal position sensor 3, a signal from the brake pedal position sensor 4, and the vehicle speed Vact, etc., from the vehicle-speed calculating unit 52a of the actual-state-quantity obtaining unit 52.

The actuator operation target-value synthesizing unit 59 includes an actuator operation FB target-value distribution processing unit 59a which distributes the FB target-yaw-moment Mc2 input from the adder 58 to the driving and braking forces of individual wheels W, and a synthesizing and outputting unit 59b which adds the calculation result by the actuator operation FB target-value distribution processing unit 59a and an FF target value input from the FF target-value setting unit 51, and which outputs the addition result to the hydraulic circuit 28 and the brake control ECU 29.

The actuator operation FB target-value distribution processing unit 59a substantially corresponds to the "actuator operation FB target-value distribution processing unit 222" disclosed in, for example, US 2009/0118905 A1US 2009/0118905 A1, paragraphs from 0296 to 0378, and FIG. 12. The actuator operation FB target-value distribution processing unit 59a calculates and sets a FB target first-wheel brake driving/braking force by the brake BfL, a FB target second-wheel brake driving/braking force by the brake BfR, a FB target third-wheel brake driving/braking force by the brake BrL, and a FB target fourth-wheel brake driving/braking force by the brake BrR to the front wheel WfL, the front wheel WfR, the rear wheel WrL, and the rear wheel WrR, respectively.

The synthesizing and outputting unit 59b substantially corresponds to the "actuator operation target-value synthesizing unit 24" disclosed in, for example, US 2009/0118905 A1, paragraphs from 0389 to 0432 and FIG. 18).

More specifically, the synthesizing and outputting unit 59b calculates a target first-wheel brake driving/braking force by the brake BfL and a target first-wheel slip ratio based on the FF target first-wheel brake driving/braking force and the FF target first-wheel driving system driving/braking force both set by the FF target-value setting unit 51, and the FB target first-wheel brake driving/braking force calculated and set by the actuator operation FB target-value distribution processing unit 59a, and outputs those calculated results to the brake control ECU 29.

Also, the synthesizing and outputting unit 59b calculates a target second-wheel brake driving/braking force by the brake BfR and a target second-wheel slip ratio based on the FF target second-wheel brake driving/braking force and the FF target second-wheel driving system driving/braking force both set by the FF target-value setting unit 51, and the FB target second-wheel brake driving/braking force calculated and set by the actuator operation FB target-value distribution processing unit 59a, and outputs those calculated results to the brake control ECU 29.

Also, the synthesizing and outputting unit 59b calculates a target third-wheel brake driving/braking force by the brake BrL and a target third-wheel slip ratio based on the FF target third-wheel brake driving/braking force and the FF target third-wheel driving system driving/braking force both set by the FF target-value setting unit 51, and the FB target third-wheel brake driving/braking force calculated and set by the actuator operation FB target-value distribution processing unit 59*a*, and outputs those calculated results to the brake control ECU 29.

Also, the synthesizing and outputting unit 59*b* calculates a target fourth-wheel brake driving/braking force by the brake BrR and a target fourth-wheel slip ratio based on the FF target fourth-wheel brake driving/braking force and the FF target fourth-wheel driving system driving/braking force both set by the FF target-value setting unit 51, and the FB target fourth-wheel brake driving/braking force calculated and set by the actuator operation FB target-value distribution processing unit 59*a*, and outputs those calculated results to the brake control ECU 29.

The front-wheel actual slip angle $\beta f\_act$, the rear-wheel actual slip angle $\beta r\_act$, and the road friction coefficient $\mu$ calculated by the actual-state-quantity obtaining unit 52 are used when the target nth (where n=1 to 4) wheel brake driving/braking force of individual wheel W and the target nth wheel slip ratio are calculated.

Also, the synthesizing and outputting unit 59*b* outputs the target first-wheel driving system driving/braking force and the FF target second-wheel driving system driving/braking force set by the FF target-value setting unit 51 to the hydraulic circuit 28, and outputs the FF target mission deceleration ratio set by the FF target-value setting unit 51 to the engine ECU 27 that also controls the transmission T/M.

<<Virtual External-Force Calculating Unit>>

The virtual external-force calculating unit 61 calculates the virtual external-force yaw moment Mv around the weighted center $C_G$ of the model vehicle 1*d* through a following equation (13) based on the deviations $\gamma err$, and $\beta err$, and outputs the calculated result to the adder 63.

$$Mv = K_8 \cdot (K_6 \cdot \gamma err + K_7 \cdot \beta err) \quad (13)$$

The function of the virtual external-force calculating unit 61 substantially corresponds to the virtual external-force provisional value setting unit 201 disclosed in FIG. 9, etc., of US 2009/0118905 A1 other than to multiply the feedback gain $K_8$. However, this embodiment differs in that only the virtual external-force yaw moment Mv is calculated.

$K_6$ and $K_7$ are feedback gains set beforehand. Also, $K_8$ is a feedback gain set and controlled by the virtual-external-force-calculation controlling unit 62. The detail thereof will be discussed later together with the explanation for the flowchart of the virtual-external-force-calculation controlling unit 62 shown in FIG. 6.

<<Anti-Spin Virtual-Yaw-Moment FB Control>>

Next, with reference to FIG. 2, an explanation will be given of an anti-spin virtual-yaw-moment FB (feedback) control. This control is to calculate an anti-spin/virtual FB yaw moment Mvl_asp around the weighted center $C_G$ (see FIG. 3) of the model vehicle 1*d* from a equation (14) to be discussed later and to input the calculated anti-spin/virtual FB yaw moment Mvl_asp to the adder 63 in order to suppress a spin of the model vehicle 1*d* (see FIG. 1) originating from oversteering.

$$Mvl\_asp = K_9 \cdot \beta r\_act2 \quad (14)$$

where $K_9$ is a feedback gain set beforehand. The feedback gain $K_9$ may have the same value as that of the feedback gain $K_5$.

The adder 63 adds the virtual external-force yaw moment Mv and the anti-spin/virtual FB yaw moment Mvl_asp, and inputs the addition result to the reference dynamic-characteristic model calculating unit 54.

<<Virtual External-Force Calculation/Control>>

Next, with reference to FIG. 6 and FIG. 2 as needed, an explanation will be given of the virtual-external-force-calculation controlling unit 62 that controls the value of the feedback gains $K_8$.

Figure 6:
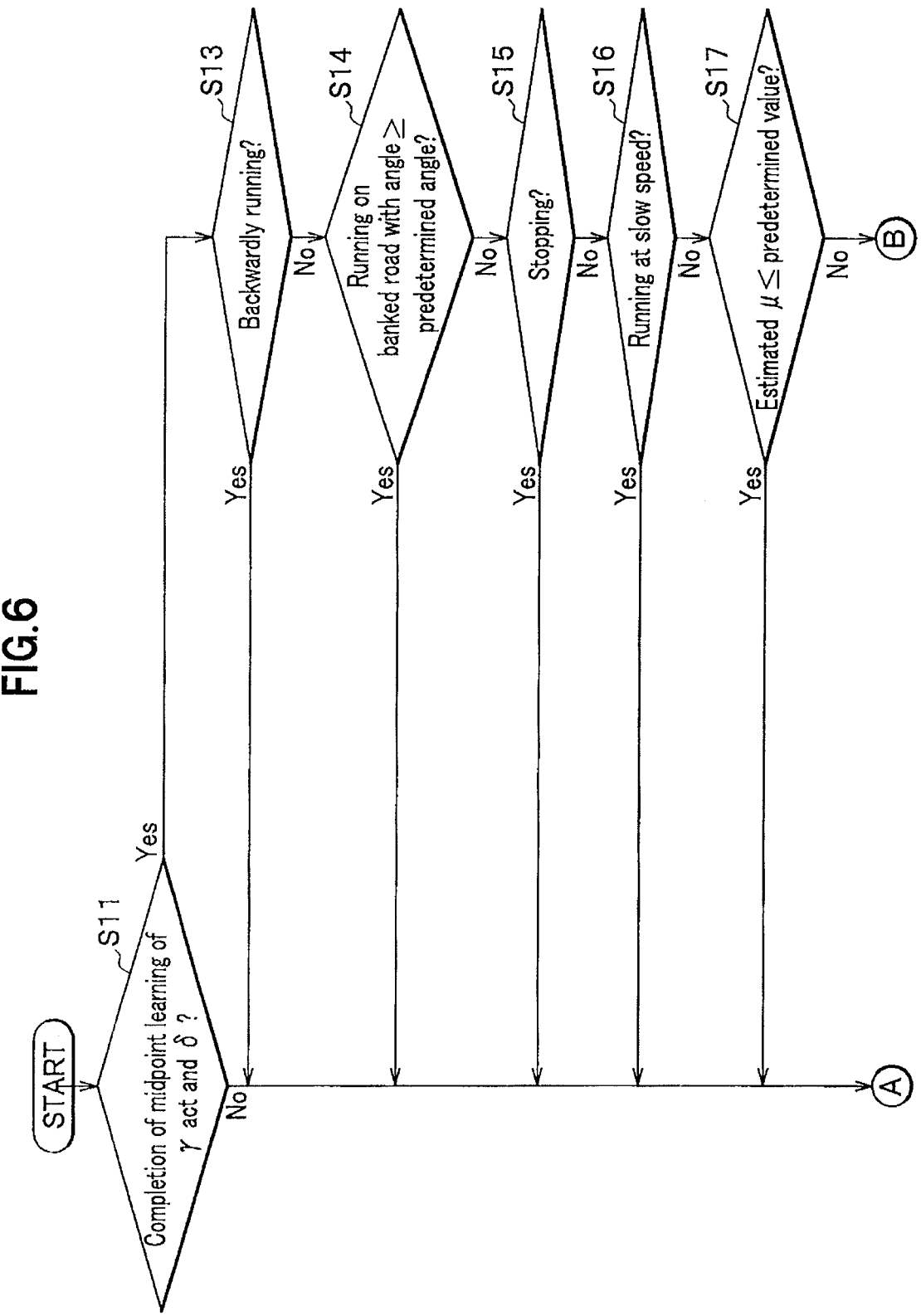
FIG. 6 is a flowchart of a control by a virtual-external-force-calculation controlling unit.

FIG. 6 is a flowchart showing the flow of the control by the virtual-external-force-calculation controlling unit 62.

The virtual-external-force-calculation controlling unit 62 prohibits the virtual external-force calculating unit 61 from correcting the virtual external force ($K_8$=0), causes the virtual external-force calculating unit 61 to reduce the correction of the virtual external force ($K_8$<1), causes the virtual external-force calculating unit 61 to increase the correction of the virtual external force ($K_8$>1), or causes the virtual external-force calculating unit 61 to directly output the correction of the virtual external force ($K_8$=1) based on the actual yaw rate $\gamma act$ from the actual-state-quantity determining unit 52*g*, the flag signal indicating that the midpoint learning of the turning angle $\delta$ does not complete yet, the stopping flag signal, the backward-running flag signal, the slow-speed-running flag signal, the banked-road flag signal, a steering-abrupt-operation flag signal, and a flag signal of a breakdown determined result when it is determined that the yaw-rate sensor 31, the lateral-direction acceleration sensor 32, the turning-angle sensor 33 or the like breaks down. This control is repeated at a certain cycle.

In step S11, the virtual-external-force-calculation controlling unit 62 unit determines whether or not the midpoint learning of the actual yaw rate $\gamma act$ and that of the turning angle $\delta$ have completed based on whether or not the flag signal indicating that such midpoint learning does not complete yet is input from the actual-state-quantity determining unit 52*g*. When the midpoint learning has not completed yet (Step S11: NO), i.e., when the flag signal indicating that the midpoint learning does not complete yet is input from the actual-state-quantity determining unit 52*g*, the process progresses to step S12 in FIG. 7 through a node A, and correction of the virtual external force is prohibited. That is, the virtual-external-force-calculation controlling unit 62 outputs a value 0 (zero) that is the feedback gain $K_8$ to the virtual external-force calculating unit 61. As a result, the virtual external-force yaw moment Mv having a value of 0 (zero) is input from the virtual external-force calculating unit 61 to the adder 63, and the process returns to a routine at next cycle.

The state in which the midpoint learning of the turning angle $\delta$ does not complete yet corresponds to a "turning-angle unestimated condition".

The reason is as follows:

When the midpoint learning of the actual yaw rate $\gamma act$ and that of the turning angle $\delta$ do not complete yet, the estimation calculation result of the vehicle-body actual slip angle $\beta z\_act$ by the vehicle-body actual-slip-angle calculating unit 52*c* in the actual-state-quantity obtaining unit 52 may include an error, so that the error included in the virtual external-force yaw moment Mv calculated based on such estimation calculation result may become large. As a result, respective differences between the actual yaw rate $\gamma act$ and the vehicle-body actual slip angle $\beta z\_act$ which are the actual attitude-state quantity of the vehicle 1 and the reference yaw rate $\gamma d$ and the vehicle-body reference slip angle $\beta z\_d$ which are the reference attitude-state quantity of the model vehicle 1*d* (see FIG. 3), i.e., the deviations $\gamma err$ and $\beta err$ calculated by the deviation calculating unit 55 increase, which causes yaw moment control based on the output from the synthesizing and outputting unit 59*b* to the hydraulic circuit 28 and the brake control ECU 29 to give strangeness to the driver. However, such strangeness originating from the yaw moment control is suppressed according to this embodiment by prohibiting the virtual external-force calculating unit 61 from correcting the virtual external force.

When the midpoint learning has completed in the step S11 (step S11: YES), i.e., when no flag signal indicating that the midpoint learning does not complete yet is received from the actual-state-quantity determining unit 52g, the process progresses to step S13, and the virtual-external-force-calculation controlling unit 62 checks whether or not the vehicle 1 is backwardly running. When the vehicle 1 is backwardly running (step S13: YES), i.e., when the backward-running flag signal is received from the actual-state-quantity determining unit 52g, the process progresses to the step S12 in FIG. 7 through the node A. When no backward-running flag signal is received (step S13: NO), the process progresses to step S14.

When the vehicle 1 is backwardly running, for example, the dynamic characteristic model used for the model vehicle 1d (see FIG. 3) used in the reference dynamic-characteristic model calculating unit 54 is based on the premise that the model vehicle 1d runs forwardly, so that respective differences between the actual yaw rate γact and the vehicle-body actual slip angle βz_act which are the actual attitude-state quantities of the vehicle 1 and the reference yaw rate γd and the vehicle-body reference slip angle βz_d which are the reference attitude-state quantities of the model vehicle 1d, i.e., the deviations γerr, and βerr calculated by the deviation calculating unit 55 become large. This causes the yaw moment control based on the output to the hydraulic circuit 28 and the brake control ECU 29 from the synthesizing and outputting unit 59b to give strangeness to the driver. However, such strangeness is suppressed according to this embodiment by prohibiting the virtual external-force calculating unit 61 from correcting the virtual external force.

The virtual-external-force-calculation controlling unit 62 checks in the step S14 whether or not the vehicle 1 is running on a banked road with an angle equal to or larger than a predetermined angle. More specifically, it is checked based on whether or not the banked-road flag signal is received from the actual-state-quantity determining unit 52g. When the vehicle 1 is running on the banked road with an angle equal to or larger than the predetermined angle (step S14: YES), the process progresses to the step S12 in FIG. 7 through the node A. When the vehicle 1 is not running on such a banked road (step S14: NO), the process progresses to step S15.

When the vehicle 1 is running on the banked road with an angle equal to or larger than the predetermined angle, for example, the lateral direction acceleration Gs detected by the lateral-direction acceleration sensor 32 becomes to include an error, so that the estimation calculation result of the vehicle-body actual slip angle βz_act by the vehicle-body actual-slip-angle calculating unit 52c in the actual-state-quantity obtaining unit 52 may include an error. Accordingly, the virtual external-force yaw moment Mv calculated based on such estimation calculation result may include a large error. Hence, respective differences between the actual yaw rate γact and the vehicle-body actual slip angle βz_act which are the actual attitude-state quantities of the vehicle 1 and the reference yaw rate γd and the vehicle-body reference slip angle βz_d which are the reference attitude-state quantities of the model vehicle 1d (see FIG. 3), i.e., the deviations γerr, and βerr calculated by the deviation calculating unit 55 become large. This causes the yaw moment control based on the output to the hydraulic circuit 28 and the brake control ECU 29 from the synthesizing and outputting unit 59b to give strangeness to the driver. However, such strangeness is suppressed according to this embodiment by prohibiting the virtual external-force calculating unit 61 from correcting the virtual external force.

The virtual-external-force-calculation controlling unit 62 checks in the step S15 whether or not the vehicle 1 is stopping. More specifically, it is checked based on whether or not the stopping flag signal is received from the actual-state-quantity determining unit 52g. When the vehicle 1 is stopping (step S15: YES), the process progresses to the step S12 in FIG. 7 through the node A. When the vehicle 1 is not stopping (step S15: NO), the process progresses to step S16. It is needless to say that the correction of the virtual external force is prohibited while the vehicle 1 is stopping.

The virtual-external-force-calculation controlling unit 62 checks in the step S16 whether or not the vehicle 1 is running at a slow speed. More specifically, it is checked based on whether or not the running flag indicating that the vehicle 1 is running at a speed slower than a predetermined speed is received from the actual-state-quantity determining unit 52g. When the vehicle 1 is running at a slow speed (step S16: YES), the process progresses to the step S12 in FIG. 7 through the node A. When the vehicle 1 is not running at a slow speed (step S16: NO), the process progresses to step S17.

When the vehicle 1 is running at a slow speed slower than the predetermined speed, the precision of calculation of the vehicle-body actual slip angle βz_act by the vehicle-body actual-slip-angle calculating unit 52c and those of calculations of the reference yaw rate γd and the vehicle-body reference slip angle βz_d by the reference dynamic-characteristic model calculating unit 54 are likely to decrease. Accordingly, the turning motion of the vehicle 1 in accordance with the operation condition of the steering wheel 21a given by the driver can be caused by prohibiting the reference dynamic-characteristic model calculating unit 54 from correcting the virtual external-force yaw moment Mv, which does not cause the driver to feel strangeness.

The virtual-external-force-calculation controlling unit 62 checks in the step S17 whether or not the estimated road friction coefficient μ is equal to or smaller than a predetermined value. More specifically, it is checked based on whether or not the low-μ flag signal indicating that the road friction coefficient is equal to or smaller than the predetermined value is received from the actual-state-quantity determining unit 52g. When the estimated road friction coefficient μ is equal to or smaller than the predetermined value (step S17: YES), the process progresses to the step S12 in FIG. 7 through the node A. When the estimated road friction coefficient μ is larger than the predetermined value (step S17: NO), the process progresses to step S18 in FIG. 7 through a node B.

The reason why the process progresses to the step S12 and correction of the virtual external force is prohibited when the road friction coefficient μ is equal to or smaller than the predetermined value is that when, for example, the vehicle 1 is running on an icy road, the precision of calculation by the reference dynamic-characteristic model calculating unit 54 and the precision of calculation of the vehicle-body actual slip angle βz_act that is the actual attitude-state quantity of the vehicle 1 decrease, so that the correction of the virtual external force based on the deviations γerr, βerr calculated by the deviation calculating unit 55 may give invert disturbance yaw moment to the vehicle 1.

Figure 7:
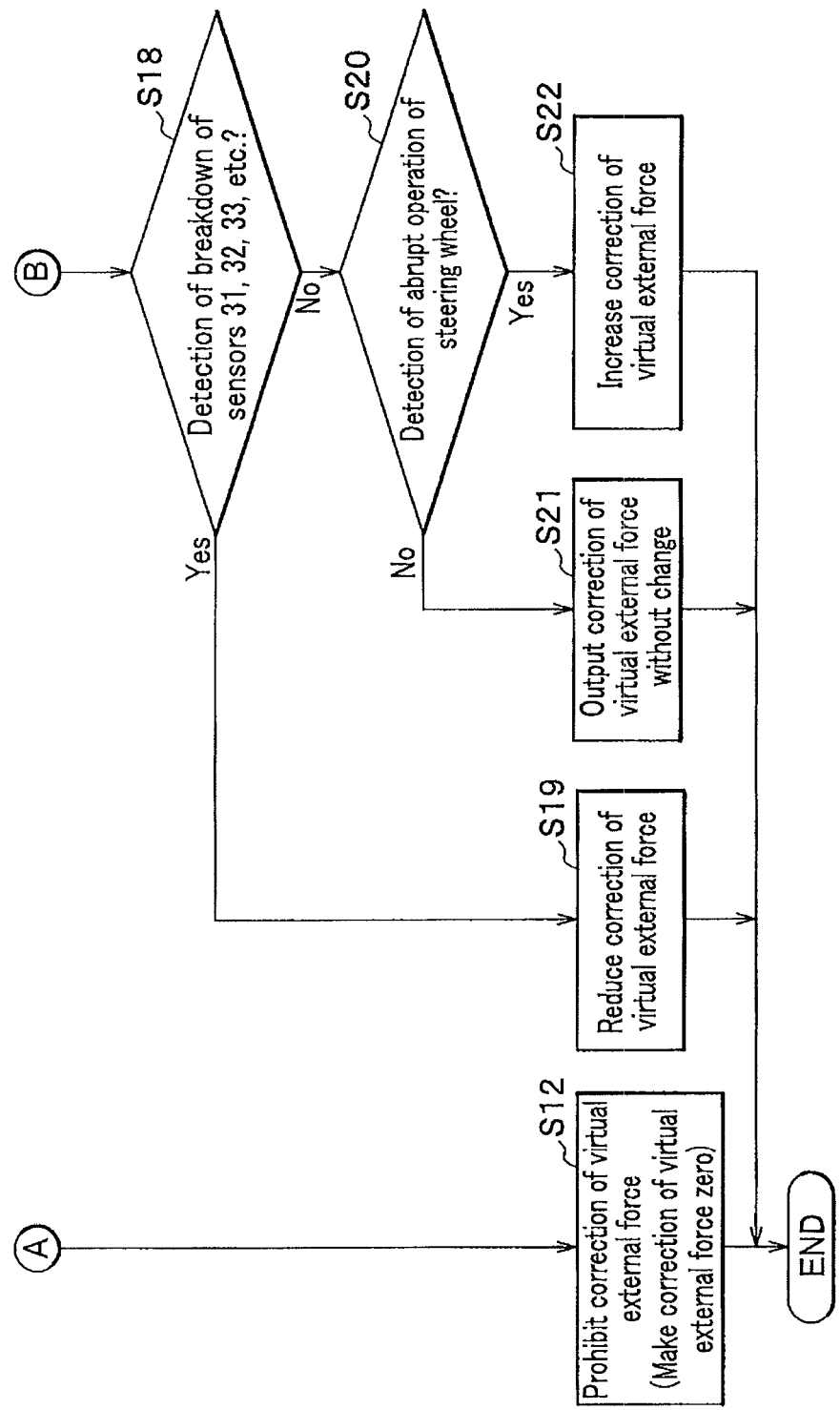
FIG. 7 is a flowchart of a control by the virtual-external-force-calculation controlling unit.

The virtual-external-force-calculation controlling unit 62 checks in the step S18 whether or not a breakdown of the yaw-rate sensor 31, the lateral-direction acceleration sensor 32, the turning-angle sensor 33, etc., used for calculation of the vehicle-body actual slip angle βz_act is detected ("detect breakdown of sensor (31, 32, 33, etc.) used for calculation of vehicle-body actual slip angle βz_act?" in FIG. 7). More specifically, it is determined that the sensor breaks down when the flag signal indicating the breakdown determined result for each sensor is received from the actual-state-quantity determining unit 52g (step S18: YES), and the process progresses to the step S19. When no such a signal is received (step S18: NO), the process progresses to step S20.

In the step S19, the virtual-external-force-calculation controlling unit 62 causes the virtual external-force calculating unit 61 to reduce the correction of the virtual external force. More specifically, the value of the feedback gain $K_8$ is set to be a value smaller than 1, e.g., 0.5. Thereafter, the process returns to a routine at next cycle.

The reason why the correction of the virtual external force is reduced, when a breakdown of the yaw-rate sensor 31, the lateral-direction acceleration sensor 32, and the turning-angle sensor 33, etc., used for calculation of the vehicle-body actual slip angle βz_act is detected, is that the precision of the alternative value of the vehicle-body actual slip angle βz_act and that of the actual yaw rate γact decrease which are calculated by the alternative-value calculating unit 52h through the alternative-value calculation method when the yaw rate sensor 31 breaks down and through the alternative-value calculation method when the turning-angle sensor 33 breaks down. Accordingly, a predetermined value, e.g., 0.5 which satisfies a condition that the feedback gain $K_8<1$ is set in order to reduce the correction of the virtual external force, thereby suppressing a difference between the motion of the model vehicle 1d and the actual motion of the vehicle 1.

The virtual-external-force-calculation controlling unit 62 checks in the step S20 whether or not the abrupt operation of the steering wheel 21a is detected. The abrupt operation of the steering wheel 21a can be detected when, for example, the actual-state-quantity determining unit 52g detects and determines that the vehicle speed Vact is equal to or faster than a predetermined speed and the absolute value of the steering wheel angle velocity θ' which is a time differentiation of the steering wheel angle θ is equal to or larger than a predetermined value. More specifically, detection of the abrupt operation of the steering wheel 21a can be checked based on whether or not the steering-abrupt-operation flag signal is received from the actual-state-quantity determining unit 52g.

When the abrupt operation of the steering wheel 21a is detected (step S20: YES), the process progresses to the step S22. When no abrupt operation of the steering wheel 21a is detected (step S20: NO), the process progresses to step S21.

In the step S21, the correction of the virtual external force is directly output. More specifically, the feedback gain $K_8$ which is set to be 1 is input to the virtual external-force calculating unit 61. Thereafter, the process returns to a routine at next cycle.

In the step S22, the virtual-external-force-calculation controlling unit 62 causes the virtual external-force calculating unit 61 to increase the correction of the virtual external force. When the steering wheel 21a is abruptly operated while the vehicle 1 is running at a speed equal to or faster than a predetermined speed, the feedback gain $K_8$ is set to be a value over 1, e.g. 1.5 and is input into the virtual external-force calculating unit 61 so that the vehicle 1 has a motion intended by the driver.

As a result, the reference dynamic-characteristic model calculating unit 54 outputs the reference yaw rate γd and the vehicle-body reference slip angle βz_d in accordance with the quick motion over the dynamic characteristic model of the model vehicle 1d to the deviation calculating unit 55. Respective deviations γerr and βerr between the actual yaw rate γact and the vehicle-body actual slip angle βz_act and the reference yaw rate γd and the vehicle-body reference slip angle βz_d become large, so that a vehicle motion with a sharpness (i.e., with a good response) can be realized through the FB target yaw moment Mc_nom2. Thereafter, the process returns to a routine at next cycle.

The step S16 in the flowchart for this embodiment corresponds to a "slow-speed running determining unit", and the step S17 corresponds to a "low road-friction-coefficient determining unit".

As explained above, according to this embodiment, when a signal from the sensors which detect the operated state quantities of the vehicle 1, such as the selected/operated position of the select lever, the operation of the steering wheel 21a, the operation of the brake pedal, and the operation of the acceleration pedal, and sensors which detect the motional state quantities, such as the yaw-rate sensor 31, and the lateral-direction acceleration sensor 32, is abnormal or when it is expected that the actual-state-quantity obtaining unit 52 which estimates the vehicle-body actual slip angle βz_act that is the actual attitude-state quantity of the vehicle 1 calculates an abnormal result based on the signal from the foregoing sensor, the virtual-external-force-calculation controlling unit 62 prohibits the correction of the virtual external force from the virtual external-force calculating unit 61 or performs control so that the virtual external force decreases. As a result, excessive motion control on the vehicle 1 originating from a large difference between the actual attitude-state quantity (e.g., the vehicle-body actual slip angle βz_act and the actual yaw rate γact) of the vehicle 1 and the reference attitude-state quantity (e.g., the vehicle-body reference slip angle βz_d, and the reference yaw rate γd) of the model vehicle 1d can be controlled, thereby preventing the driver from feeling strangeness.

Also, in a case in which there is no abnormality in a signal from the sensors 2, 3, 4, 33 (21c) which detect the operated state quantities of the vehicle 1, such as the selected/operated position of the select lever, the operation of the acceleration pedal, the operation of the brake pedal, and the operation of the steering wheel 21a, and the sensors 30 (30fL, 30fR, 30rL, and 30rR), 31, 32, etc., which detect the motional state quantities, such as a wheel speed, a yaw rate, and a lateral direction acceleration, when abrupt operation of the steering wheel 21a given by the driver is detected while the vehicle 1 is running at a speed equal to or faster than a predetermined speed, the virtual-external-force-calculation controlling unit 62 increases the correction of the virtual external force so that the vehicle 1 has a motion intended by the driver.

As a result, a vehicle motion with a sharpness (with a good response) can be realized.

According to this embodiment, the control unit 37 does not perform active control on the turning angle δ although the steer-by-wire type front-wheel steering device is employed. However, as disclosed in US 2009/0118905 A1, the steering motor 25a may be used as an "actuator", the FE target-value setting unit 51 may set a target value of the turning angle δ based on the steering wheel angle θ, and the actuator operation target-value synthesizing unit 59 may additionally correct the target value of the turning angle δ, thereby controlling the steering motor 25a.

The present invention can be applied to not only the vehicle 1 employing the steer-by-wire type front-wheel steering device but also a vehicle employing a motor-driven power steering device which gives auxiliary force to the rack-and-pinion type front-wheel steering device from a motor.

When the front-wheel steering device is not the steer-by-wire type, the operation amount and the turning angle δ detected by the steering angle detecting sensor 21c are unique, so that the turning angle δ can be obtained based on a signal from the steering angle detecting sensor 21c.

What is claimed is:

1. A vehicle motion control apparatus comprising:
   an operated state detecting unit configured to detect an operated state quantity of a vehicle given by a driver;
   a motional state detecting unit configured to detect a motional state quantity of the vehicle;
   a reference attitude-state quantity calculating unit configured to calculate a reference attitude-state quantity of the vehicle corresponding to the operated state quantity of the vehicle and the motional state quantity of the vehicle based on a motional model of the vehicle in a condition in which a predetermined external force is applied to the vehicle;
   an actual attitude-state determining unit configured to determine an actual attitude-state quantity of the vehicle based on a detection signal from the operated state detecting unit and a detection signal from the motional state detecting unit;
   an attitude-state-quantity deviation calculating unit configured to calculate a deviation of the actual attitude-state quantity of the vehicle from the reference attitude-state quantity of the vehicle;
   a virtual external-force calculating unit configured to make a correction of the external force based on the deviation calculated by the attitude-state-quantity deviation calculating unit and feed back the external force with the correction to the reference attitude-state quantity calculating unit;
   an actuator control unit configured to determine, based on the deviation calculated by the attitude-state-quantity deviation calculating unit, the drive amount of an actuator which generates a motion of the vehicle; and
   a virtual-external-force-calculation controlling unit configured to control the correction of the external force by the virtual external-force calculating unit based on a detection condition of the operated state detecting unit or the motional state detecting unit,
   wherein the virtual-external-force-calculation controlling unit controls the virtual external-force calculating unit to either increase or reduce the correction of the external force when the detection condition of the operated state detecting unit or the motional state detecting unit is in a predetermined condition.

2. The vehicle motion control apparatus according to claim 1, wherein the virtual-external-force-calculation controlling unit prohibits, based on the detection condition of the operated state detecting unit or the motional state detecting unit, the virtual external-force calculating unit from correcting the external force.

3. The vehicle motion control apparatus according to claim 1, further comprising a detected abnormality determining unit configured to determine whether there is an abnormality of the operated state detecting unit or the motional state determining unit, wherein
   the actual attitude-state setting unit includes an alternative-value calculating unit configured to calculate the actual attitude-state quantity using a predetermined alternative value, and
   when the detected abnormality determining unit detects the abnormality of the operated state detecting unit or the motional state detecting unit,
   the virtual-external-force-calculation controlling unit controls the correction of the external force in the virtual external-force calculating unit, and
   the alternative-value calculating unit calculates the actual attitude-state quantity using the predetermined alternative value.

4. The vehicle motion control apparatus according to claim 1, wherein when a turning angle detected by the operated state detecting unit is in a turning-angle unestimated condition, the virtual-external-force-calculation controlling unit prohibits the virtual external-force calculating unit from correcting the external force.

5. The vehicle motion control apparatus according to claim 1, wherein when the vehicle is in a backward running condition based on the operated state detecting unit or the motional state detecting unit, the virtual-external-force-calculation controlling unit prohibits the virtual external-force calculating unit from correcting the external force.

6. The vehicle motion control apparatus according to claim 1, wherein
   the motional state detecting unit includes an inclination determining unit configured to determine an inclination of a road in a lateral direction of the vehicle, and
   the virtual-external-force-calculation controlling unit prohibits the virtual external-force calculating unit from correcting the external force when the inclination determining unit detects an inclination angle of the road equal to or larger than a predetermined angle.

7. The vehicle motion control apparatus according to claim 1, further comprising a slow-speed-running determining unit configured to determine whether or not a vehicle speed is equal to or slower than a predetermined speed, wherein
   the virtual-external-force-calculation controlling unit prohibits the virtual external-force calculating unit from correcting the external force when the slow-speed-running determining unit determines that the vehicle speed is equal to or slower than the predetermined speed.

8. The vehicle motion control apparatus according to claim 1, further comprising a low-road-friction-coefficient determining unit that determines whether or not a friction coefficient of a road is equal to or smaller than a predetermined value, wherein
   the virtual-external-force-calculation controlling unit prohibits the virtual external-force calculating unit from correcting the external force when the low-road-friction-coefficient determining unit determines that the friction coefficient of the road is equal to or smaller than the predetermined value.

9. A vehicle motion control apparatus comprising:
   an operated state detecting unit configured to detect an operated state quantity of a vehicle given by a driver;
   a motional state detecting unit configured to detect a motional state quantity of the vehicle;
   a reference attitude-state quantity calculating unit configured to calculate a reference attitude-state quantity of the vehicle corresponding to the operated state quantity of the vehicle and the motional state quantity of the vehicle based on a motional model of the vehicle in a condition in which a predetermined external force is applied to the vehicle;
   an actual attitude-state determining unit configured to determine an actual attitude-state quantity of the vehicle based on a detection signal from the operated state detecting unit and a detection signal from the motional state detecting unit;
   an attitude-state-quantity deviation calculating unit configured to calculate a deviation of the actual attitude-state quantity of the vehicle from the reference attitude-state quantity of the vehicle;

a virtual external-force calculating unit configured to make a correction of the external force based on the deviation calculated by the attitude-state-quantity deviation calculating unit and feed back the external force with the correction to the reference attitude-state quantity calculating unit;

an actuator control unit configured to determine, based on the deviation calculated by the attitude-state-quantity deviation calculating unit, the drive amount of an actuator which generates a motion of the vehicle; and a virtual-external-force-calculation controlling unit configured to control the correction of the external force by the virtual external-force calculating unit based on a detection condition of the operated state detecting unit or the motional state detecting unit, wherein the virtual-external-force-calculation controlling unit prohibits, based on the detection condition of the operated state detecting unit or the motional state detecting unit, the virtual external-force calculating unit from correcting the external force.

10. A vehicle motion control apparatus comprising:

an operated state detecting unit configured to detect an operated state quantity of a vehicle given by a driver;

a motional state detecting unit configured to detect a motional state quantity of the vehicle;

a reference attitude-state quantity calculating unit configured to calculate a reference attitude-state quantity of the vehicle corresponding to the operated state quantity of the vehicle and the motional state quantity of the vehicle based on a motional model of the vehicle in a condition in which a predetermined external force is applied to the vehicle;

an actual attitude-state determining unit configured to determine an actual attitude-state quantity of the vehicle based on a detection signal from the operated state detecting unit and a detection signal from the motional state detecting unit;

an attitude-state-quantity deviation calculating unit configured to calculate a deviation of the actual attitude-state quantity of the vehicle from the reference attitude-state quantity of the vehicle;

a virtual external-force calculating unit configured to make a correction of the external force based on the deviation calculated by the attitude-state-quantity deviation calculating unit and feed back the external force with the correction to the reference attitude-state quantity calculating unit;

an actuator control unit configured to determine, based on the deviation calculated by the attitude-state-quantity deviation calculating unit, the drive amount of an actuator which generates a motion of the vehicle;

a virtual-external-force-calculation controlling unit configured to control the correction of the external force by the virtual external-force calculating unit based on a detection condition of the operated state detecting unit or the motional state detecting unit; and a detected abnormality determining unit configured to determine whether there is an abnormality of the operated state detecting unit or the motional state determining unit, wherein the actual attitude-state setting unit includes an alternative-value calculating unit configured to calculate the actual attitude-state quantity using a predetermined alternative value, and when the detected abnormality determining unit detects the abnormality of the operated state detecting unit or the motional state detecting unit, the virtual-external-force-calculation controlling unit controls the correction of the external force in the virtual external-force calculating unit, and the alternative-value calculating unit calculates the actual attitude-state quantity using the predetermined alternative value.

* * * * *